US010315535B2

(12) United States Patent
Asai et al.

(10) Patent No.: US 10,315,535 B2
(45) Date of Patent: Jun. 11, 2019

(54) SEAT SUPPORT MECHANISM, SEAT STRUCTURE AND SUSPENSION SEAT

(71) Applicant: Delta Tooling Co., Ltd., Hiroshima-shi (JP)

(72) Inventors: Terumi Asai, Aki-gun (JP); Katsuhiro Inoue, Hiroshima (JP); Etsunori Fujita, Higashihiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 92 days.

(21) Appl. No.: 15/519,320

(22) PCT Filed: Oct. 16, 2015

(86) PCT No.: PCT/JP2015/079382
§ 371 (c)(1),
(2) Date: Apr. 14, 2017

(87) PCT Pub. No.: WO2016/060270
PCT Pub. Date: Apr. 21, 2016

(65) Prior Publication Data
US 2017/0232871 A1 Aug. 17, 2017

(30) Foreign Application Priority Data

Oct. 16, 2014 (JP) .................................. 2014-211638
May 19, 2015 (JP) .................................. 2015-102314
Jun. 5, 2015 (JP) .................................. 2015-115328

(51) Int. Cl.
*B60N 2/16* (2006.01)
*B60N 2/50* (2006.01)
(Continued)

(52) U.S. Cl.
CPC ............. *B60N 2/1615* (2013.01); *B60N 2/16* (2013.01); *B60N 2/165* (2013.01); *B60N 2/505* (2013.01);
(Continued)

(58) Field of Classification Search
CPC ........ B60N 2/1615; B60N 2/16; B60N 2/165; B60N 2/505; B60N 2/507; B60N 2/522; B60N 2/54; B60N 2/548; B60N 2/7011
(Continued)

(56) References Cited

U.S. PATENT DOCUMENTS

2005/0006937 A1 1/2005 Takata et al.
2006/0279119 A1 12/2006 Fujita et al.
(Continued)

FOREIGN PATENT DOCUMENTS

GB    2033531    *  1/1979
JP    7-24637 U     5/1995
(Continued)

OTHER PUBLICATIONS

International Search Report dated Jan. 12, 2016, in PCT/JP2015/079382, filed Oct. 16, 2015.

*Primary Examiner* — Mark R Wendell
(74) *Attorney, Agent, or Firm* — Oblon, McClelland, Maier & Neustadt, L.L.P.

(57) ABSTRACT

A seat support mechanism including a lifter, and configured to perform a cushion frame suspension function no matter to what height a cushion frame is adjusted. Torsion bars extending in the width direction of a cushion frame and elastically supporting the cushion frame are supported by a link mechanism disposed between sliders and the cushion frame. Even if the attitude of the link mechanism is displaced when the lifter adjusts the height, the positions of the torsion bars are displaced so as to follow the displacement.

(Continued)

The torsion bars elastically support the cushion frame no matter to what height the torsion bars are displaced. Thus, no matter to what height the cushion frame is adjusted, the torsion bars are able to support the cushion frame with predetermined elasticity and to exhibit predetermined vibration absorption characteristics.

11 Claims, 39 Drawing Sheets

(51) Int. Cl.
  *B60N 2/52* (2006.01)
  *B60N 2/54* (2006.01)
  *B60N 2/70* (2006.01)
(52) U.S. Cl.
  CPC .............. *B60N 2/507* (2013.01); *B60N 2/522* (2013.01); *B60N 2/54* (2013.01); *B60N 2/548* (2013.01); *B60N 2/7011* (2013.01)
(58) Field of Classification Search
  USPC .................................................... 297/344.15
  See application file for complete search history.

(56) References Cited

U.S. PATENT DOCUMENTS

| | | | |
|---|---|---|---|
| 2006/0279120 A1 | 12/2006 | Fujita et al. | |
| 2009/0261224 A1 | 10/2009 | Yamada et al. | |
| 2014/0339878 A1* | 11/2014 | Ogura | B60N 2/66 297/452.48 |
| 2015/0108820 A1* | 4/2015 | Fujita | B60N 2/7011 297/452.48 |
| 2016/0068087 A1 | 3/2016 | Fujita et al. | |

FOREIGN PATENT DOCUMENTS

| | | | |
|---|---|---|---|
| JP | 2004-74979 A | 3/2004 |
| JP | 2004-92718 A | 3/2004 |
| JP | 2004-147670 A | 5/2004 |
| JP | 2006-345952 A | 12/2006 |
| JP | 2006-345953 A | 12/2006 |
| JP | 2007-112393 A | 5/2007 |
| JP | 2014-213752 A | 11/2014 |

\* cited by examiner

SEAT SUPPORT MECHANISM, SEAT STRUCTURE AND SUSPENSION SEAT

TECHNICAL FIELD

The present invention relates to a seat support mechanism including a lifter that adjusts the height of a seat cushion, and a seat structure and suspension seat including the seat support mechanism.

BACKGROUND ART

Typically, a seat structure such as a vehicle seat includes a slider that adjusts the front-rear position thereof, as well as a lifter that adjusts the vertical position (height) of a seat cushion. For example, in Patent Literature 1, a link mechanism including a pair of left and right rear link mechanisms and a pair of left and right front link mechanisms is disposed between the cushion frame of a seat cushion and upper rails. When a lever disposed on a side of the seat is operated to input a torque, a rotational force is transmitted to a gear disposed on the cushion frame. The gear rotates by the rotational force to vertically move the cushion frame relative to the upper rails.

On the other hand, the present applicant has proposed a vehicle seat where torsion bars are disposed on one or both of front and rear portions of a cushion frame along the width direction; arms are disposed on the torsion bars at a predetermined distance so as to be supported by the torsion bars; frames are disposed between the arms; and a two-dimensional or three-dimensional net member is disposed on the frames (see Patent Literatures 2, 3).

Also, the present applicant has disclosed a suspension mechanism having a roll absorption function in Patent Literature 4. This roll absorption suspension mechanism is disposed so as to be stacked on an upper portion of a vertical-vibration absorption suspension mechanism.

CITATION LIST

Patent Literature

Patent Literature 1: Japanese Unexamined Patent Application Publication No. 2004-92718
Patent Literature 2: Japanese Unexamined Patent Application Publication No. 2006-345952
Patent Literature 3: Japanese Unexamined Patent Application Publication No. 2006-345953
Patent Literature 4: Japanese Unexamined Patent Application Publication No. 2014-213752

SUMMARY OF INVENTION

Technical Problem

The mechanism of a lifter is not limited to that of Patent Literature 1, and various types of lifter mechanisms are known. However, any type of lifter mechanism basically has only a function of adjusting the height of a seat cushion (cushion frame). While a lifter mechanism that adjusts the height and at the same time adjusts the front-rear position is also known, this lifter mechanism is mainly used to adjust the height position of a cushion frame.

On the other hand, Patent Literatures 2, 3 are characterized in that the net member is supported by the torsion bars and therefore a high vibration absorption function is exerted during traveling. However, these torsion bars only elastically support the net member supported by the cushion frame and do not elastically support the cushion frame itself with respect to the upper rails. As long as a structure in which a cushion frame itself is elastically supported by upper rails is employed, the vibration absorption function can be improved by the elasticity of the elastic member. This applies to both a seat where a net member is disposed on a cushion frame and a seat where a cushion pan or plane spring is disposed on a cushion frame and a urethane member is placed thereon. However, the vertical height of the cushion frame is preferably adjusted using a lifter. Having both functions makes the structure complicated, as well as increases cost.

On the other hand, even if a cushion frame has a structure having both a height adjustment function using a lifter and an elastic function for absorbing vibration, if this structure is combined with a suspension mechanism as disclosed in Patent Literature 4, a higher vibration absorption function can be obtained.

The present invention has been made in view of the foregoing, and an object thereof is to provide a seat support mechanism that is able to support a seat with predetermined elasticity no matter to what height a cushion frame is adjusted by a lifter, as well as no matter how a cushion member is disposed, and a seat structure that includes the seat support mechanism and is preferred as a vehicle seat. Another object of the present invention is to provide a suspension seat where the seat structure including the seat support mechanism is combined with another suspension mechanism and which is able to exert a higher vibration absorption function.

Solution to Problem

To solve the above problem, a seat support mechanism of the present invention is a seat support mechanism including a lifter configured to adjust a height of a seat cushion, a link mechanism disposed between a base supporting a cushion frame of the seat cushion and the cushion frame and configured to be displaced when the height is adjusted. The lifter includes a clutch mechanism configured to provide a rotational force, a rotational force transmission mechanism including a rotor that rotates by a rotational force transmitted from the clutch mechanism, and a torsion bar that has one end connected to a rotation center of the rotor of the rotational force transmission mechanism of the lifter and the other end connected to the link mechanism and extends in a width direction of the cushion frame. The torsion bar has both a function of, when the lifter adjusts the height, adjusting a height of the cushion frame by elasticity thereof using the other end connected to the link mechanism as a fixed end and a function of, when external vibration is inputted, absorbing the vibration by elasticity thereof using the one end connected to the rotor of the rotational force transmission mechanism as a fixed end on the basis of movement of the link mechanism based on displacement of the cushion frame relative to the base.

The link mechanism preferably includes a pair of front link mechanisms located on a front portion of the cushion frame and disposed so as to be spaced from each other in the width direction and a pair of rear link mechanisms located on a rear portion of the cushion frame and disposed so as to be spaced from each other in the width direction. The torsion bar preferably includes a front torsion bar corresponding to the front link mechanisms, and a rear torsion bar corresponding to the rear link mechanisms. The front torsion bar preferably has one end connected to the rotor of the rotational force transmission mechanism and the other end connected to front movable links of the front link mechanisms. The rear torsion bar preferably has one end connected to the rotor of the rotational force transmission mechanism and the other end connected to rear movable links of the rear link mechanisms.

The seat support mechanism is preferably of an independent suspension type where the front link mechanisms and the rear link mechanisms function independently of each other.

Connection movable links connecting the front link mechanisms and the rear link mechanisms may be further included, and the front link mechanisms and the rear link mechanisms may operate synchronously.

The rotor of the rotational force transmission mechanism preferably includes a front rotor configured to be rotated by a rotational force of the clutch mechanism and a rear rotor configured to be rotated by the front rotor through a connection drive link. One end of the front torsion bar is preferably connected to a rotation center of the front rotor, and one end of the rear torsion bar is preferably connected to a rotation center of the rear rotor.

One of the front rotor and the rear rotor is preferably a sector gear that is rotated by an output gear of the clutch mechanism. The one end of the front torsion bar or the rear torsion bar is preferably connected to a rotation center of the sector gear.

The base preferably consists of an upper rail of a slider mounted on the vehicle floor.

A seat structure of the present invention is a seat structure including a seat cushion supported by the seat support mechanism. The seat cushion includes a base net extending between two frame members disposed at a predetermined distance in a front-rear direction of the cushion frame and a cushion member disposed so as to cover the base net. A front edge and a rear edge of the base net extend over the frame members. The front edge and the rear edge are disposed so as to be connected by a spring member. The spring member is arranged in series with the torsion bar included in the seat support mechanism.

The base net preferably consists of a two-dimensional or three-dimensional knitted fabric. The spring member preferably consists of a coil spring.

The cushion member disposed so as to cover the base net preferably consists of a urethane material, a three-dimensional knitted fabric, or a combination thereof.

A suspension seat of the present invention is a suspension seat wherein a base of a seat structure including a seat cushion supported by the seat support mechanism of any one of claims 1 to 7 is supported by an upper portion of a suspension mechanism having a function of absorbing vibration in three directions consisting of left-right, front-rear, and vertical directions.

In a suspension seat of the present invention, the seat cushion preferably includes a base net extending between two frame members disposed at a predetermined distance in a front-rear direction of the cushion frame and a cushion member disposed so as to cover the base net. A front edge and a rear edge of the base net preferably extend over the frame members. The front edge and the rear edge are preferably connected by a spring member. The spring member is preferably arranged in series with the torsion bar included in the seat support mechanism.

Advantageous Effects of Invention

According to the seat support mechanism of the present invention, the torsion bar extending in the width direction of the cushion frame and elastically supporting the cushion frame is supported by the link mechanism disposed between the base and the cushion frame. Even if the attitude of the link mechanism is displaced when the lifter adjusts the height, the position of the torsion bar is displaced so as to follow the displacement. The torsion bar elastically supports the cushion frame no matter to what height the torsion bar is displaced. Thus, no matter to what height the cushion frame is adjusted, the torsion bar is able to support the cushion frame with predetermined elasticity and to exhibit predetermined vibration absorption characteristics. That is, the present invention has both a function of, when the lifter adjusts the height, adjusting the height of the cushion frame using the elastic force of the torsion bar connected to the link mechanism and a function of, when external vibration is inputted, absorbing the vibration of the cushion frame using the elastic force of the same torsion bar. Thus, the need to provide a dedicated suspension mechanism independent of the lifter is eliminated, allowing a low-cost seat structure having a simple structure to be provided.

In the seat structure of the present invention, the base net preferably extends between the two frame members disposed at a predetermined distance in the front-rear direction of the cushion frame; the front edge and rear edge of the base net is preferably connected by the spring member; and the cushion member is preferably disposed so as to cover the base net. Thus, when external vibration is inputted, not only the elastic force of the torsion bar supporting the cushion frame but also the elastic force of the spring member connecting the front edge and rear edge of the base net is exerted. As a result, vibration absorption characteristics can be further improved.

In the suspension seat of the present invention, the seat support mechanism that includes the lifter and performs a predetermined vibration absorption function no matter to what height the cushion frame is adjusted is disposed on the upper portion of the suspension mechanism having a function of absorbing vibration in three directions consisting of the left-right, front-rear, and vertical directions. Since a lifter-equipped seat support mechanism itself has a suspension function, such a seat support mechanism has an advantage that it can be simplified compared to a configuration obtained by combining a conventional lifter and a dedicated suspension. On the other hand, by combining a lifter-equipped seat support mechanism with another suspension mechanism, the suspension function of the lifter-equipped seat support mechanism, as well as the other suspension mechanism works and thus the vibration removal performance can be further increased. Since a combination of a lifter-equipped seat support mechanism and another suspension mechanism increases the installation space in the height direction, such a configuration is suitable for large vehicles such as tracks and buses, where the installation space in the height direction can be sufficiently reserved.

BRIEF DESCRIPTION OF THE DRAWINGS

FIG. 30 includes drawings showing load-deflection characteristics of suspensions forming the suspension mechanism used in an Experimental Example, in which FIG. 30(a) is a drawing showing load-deflection characteristics of the left-right suspension; FIG. 30(b) is a drawing showing load-deflection characteristics of the front-rear suspension; and FIG. 30(c) is a drawing showing load-deflection characteristics of the vertical suspension.

FIG. 34 includes graphs showing vibration transmission characteristics when a subject having a weight of 84 kg is seated, in which FIG. 34(a) is a graph showing characteristics when receiving left-right sinusoidal vibration; FIG. 34(b) is a graph showing characteristics when receiving front-rear sinusoidal vibration; and FIG. 34(c) is a graph showing characteristics when vertical sinusoidal vibration is inputted.

FIG. 40 includes graphs showing vibration characteristics of three subjects, in which FIG. 40(a) is a graph showing vibration characteristics when left-right sinusoidal vibration is inputted; FIG. 40(b) is a graph showing vibration characteristics when receiving front-rear sinusoidal vibration; FIG. 40(c) is a graph showing vibration characteristics when vertical sinusoidal vibration is inputted; FIG. 40(d) is a graph showing vibration characteristics using a left-right reproduced waveform collected from the track of the Ujina streetcar; FIG. 40(e) is a graph showing vibration characteristics using a front-rear reproduced waveform collected from the track of the Ujina streetcar; and FIG. 40(f) is a graph vibration characteristics using a front-rear reproduced waveform collected from the track of the Ujina streetcar.

DESCRIPTION OF EMBODIMENTS

Figure 1:
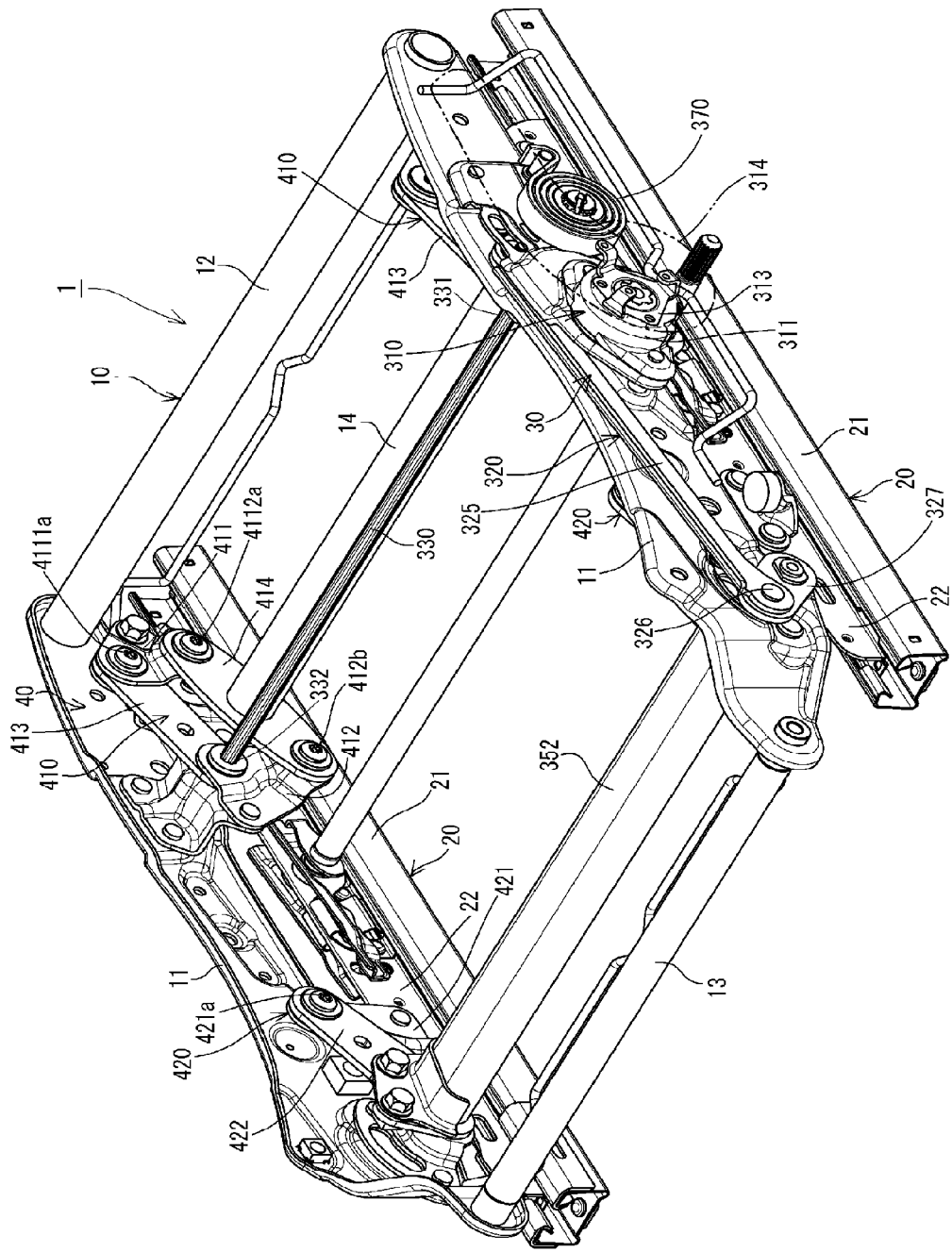
FIG. 1 is a perspective view showing a cushion frame, a lifter, a link mechanism, and the like, which are major parts of a seat support mechanism of a first embodiment of the present invention, seen from the rear.
Figure 2:
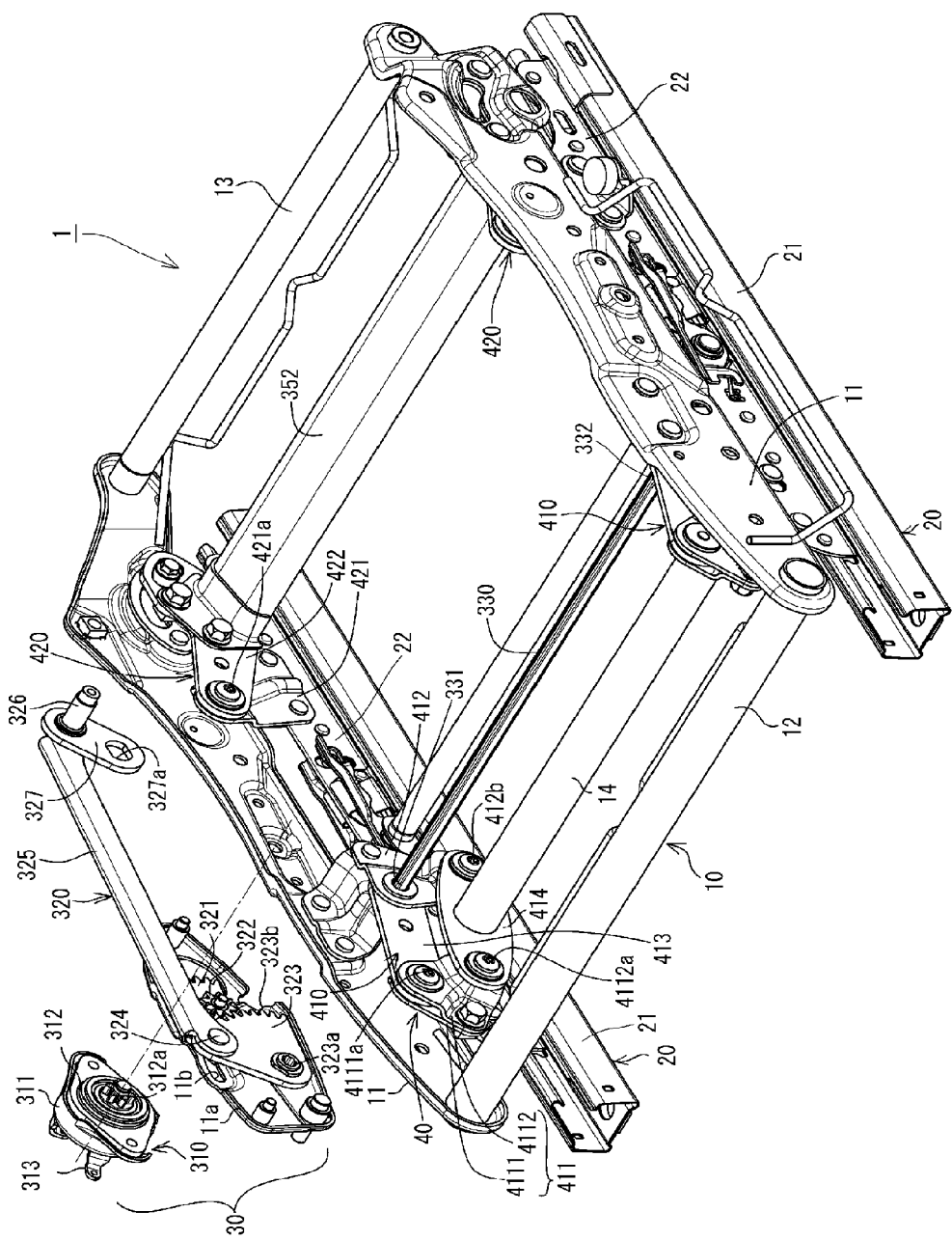
FIG. 2 is a partial exploded perspective view of FIG. 1 seen from the front.
Figure 3:
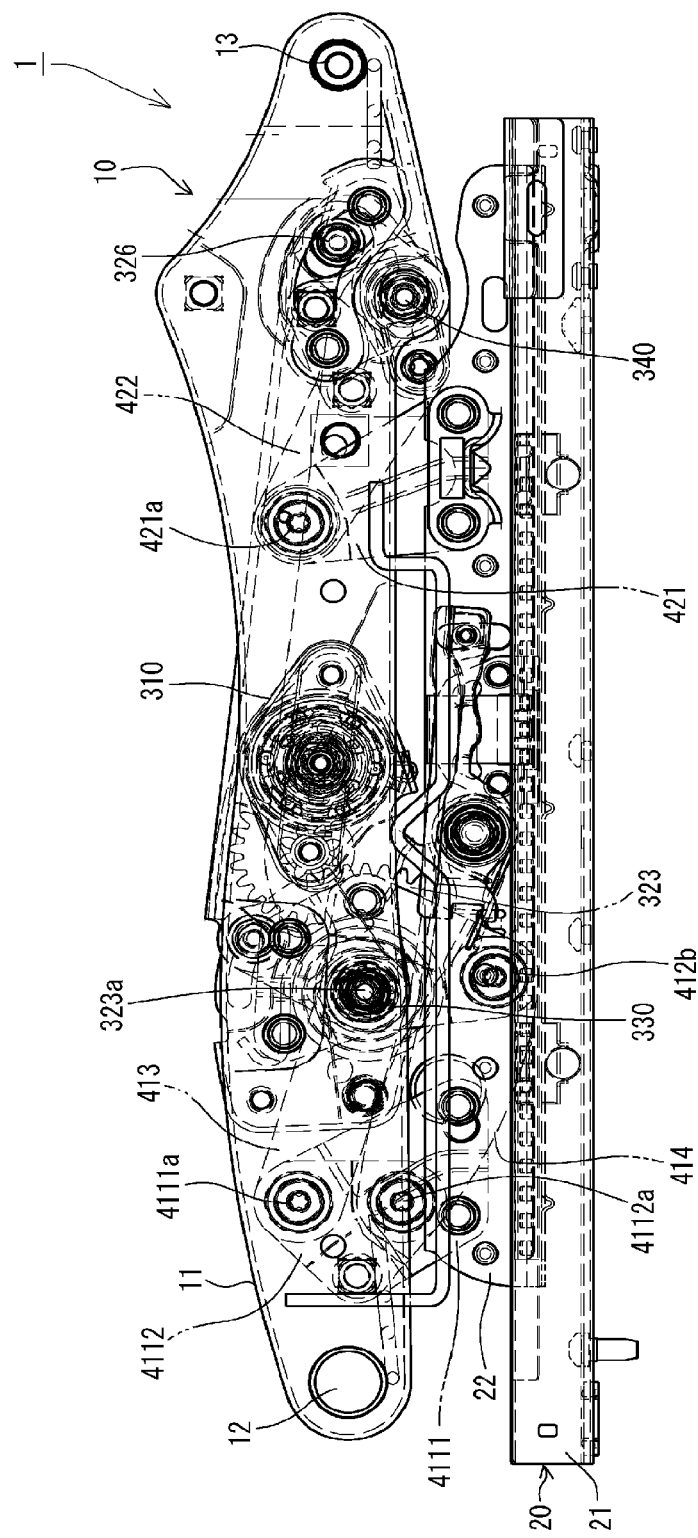
FIG. 3 is a side view of FIG. 1.
Figure 4:
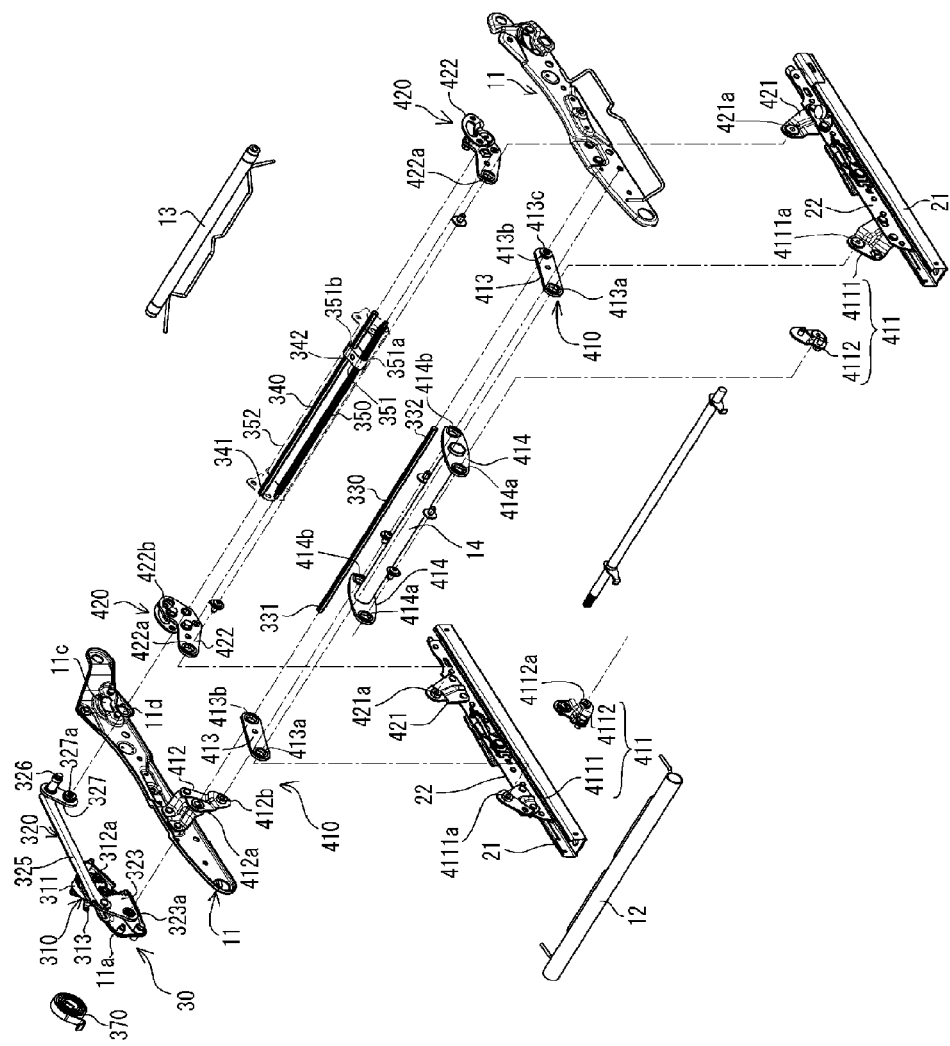
FIG. 4 is an exploded perspective view of FIG. 1 seen from the front.

Now, the present invention will be described in more detail on the basis of embodiments shown in the drawings. FIGS. 1 to 6 are drawings showing major parts of a seat support mechanism 1 of a first embodiment of the present invention. The seat support mechanism 1 of the present embodiment is used in a seat structure used as a seat for a vehicle such as an automobile and includes a lifter 30, a link mechanism 40, and the like mounted on a cushion frame 10.

As shown in FIG. 1, the cushion frame 10, which is the skeleton of a seat cushion, includes a pair of left and right side frames 11, 11 disposed at a predetermined distance, a front frame 12 disposed on the front side between the pair of left and right side frames 11, 11, and a rear frame 13 disposed on the rear side therebetween. The cushion frame 10 also includes a reinforcing pipe 14 disposed between left and right second front movable links 414, 414 of the link mechanism 40 (to be discussed later). A cushion pan or a sheet spring such as an S-shaped spring is supported by the cushion frame 10, and a cushion member having a predetermined thickness and formed of a urethan material or the like is disposed on the cushion pan or the like. These components form the sheet cushion.

In a vehicle seat as seen in the present embodiment, a pair of left and right sliders 20, 20 disposed on the floor of a vehicle body serve as bases supporting the cushion frame 10. The sliders 20, 20 have a predetermined length and include lower rails 21, 21 fixed in such a manner that the length direction thereof is along the front-rear direction of the seat cushion (cushion frame 10) and upper rails 22, 22 disposed so as to be movable along the length direction of the lower rails 21, 21. The lower rails 21, 21 are fixed to the floor, and the left and right side frames 11, 11 of the cushion frame 10 are supported by the upper rails 22, 22. Thus, the front-rear position of the cushion frame 10 can be adjusted by sliding the upper rails 22, 22 relative to the lower rails 21, 21.

The lifter 30 includes a clutch mechanism 310, a rotational force transmission mechanism 320, a front torsion bar 330, and a rear torsion bar 340. The clutch mechanism 310 is disposed by mounting a case 311 containing a rotation controller 312 on a front-side portion of one side frame 11. An operation member 314 such as a lever or handle is mounted on a rotary base 313 connected to the rotation controller 312 in the case 311 and protruding out of the case 311. The output side of the rotation controller 312 is provided with an output gear 312a. When the operation member 314 is rotated forward or backward, the rotational force is transmitted to the output gear 312a through the rotation controller 312 and thus the output gear 312a is rotated.

While the rotation controller 312 transmits a rotational force from the operation member 314 as seen above, it is configured to lock when a rotational force based on a load from the cushion frame 10 is applied to the output gear 312a. Thus, when a load based on vibration or the like is repeatedly applied to the cushion frame 10 during traveling, the cushion frame 10 can be prevented from gradually descending. Note that the rotation controller 312 need not have the above structure. For example, the rotation controller 312 may transmit a rotational force from the operation member 314 and block input from the reverse direction by using a conventional known brake spring expand/contract configuration.

As with the clutch mechanism 310, the rotational force transmission mechanism 320 is disposed outside the one side frame 11 of the cushion frame 10 and vertically moves with the vertical movement of the cushion frame 10. The rotational force transmission mechanism 320 includes a first transmission gear 321 engaged with an output gear 312a of the clutch mechanism 310, a second transmission gear 322 disposed coaxially with the first transmission gear 321, and a sector gear 323 engaged with the second transmission gear 322. In the present embodiment, the sector gear 323 is a rotor (front rotor) rotated by the clutch mechanism 310 and is disposed inside a cover member 11a mounted on the side frame 11. A bearing 323a serving as the rotation center of the sector gear 323 has one end 331 of the front torsion bar 330 fixed and connected thereto. An upper portion of the cover member 11a has an arc front guide hole 11b along the front-rear direction. An upper portion of the sector gear 323 along the outer circumference having teeth 323b is provided with a front guide pin 324 engaged with the front guide hole 11b of the cover member 11a. Thus, the rotation of the sector gear 323 causes a twist of the front torsion bar 330 connected to the bearing 323a.

The rotational force transmission mechanism 320 further includes a connection drive link 325 whose front end is pivotally supported by the front guide pin 324 engaged with the guide hole 11b and a rear drive link 327 whose upper portion is pivotally supported by the rear end of the connection drive link 325 through a rear guide pin 326. In the present embodiment, the rear drive link 327 is a rotor (rear rotor) that is rotated by the clutch mechanism 310 through the connection drive link 325. A lower portion of the rear drive link 327 has a connection hole 327a. A rotation stop bush is mounted using the connection hole 327a as the rotation center thereof, and one end 341 of the rear torsion bar 340 is connected and fixed to the rotation stop bush (see FIG. 4). The rear guide pin 326 is engaged with an arc rear guide hole 11c of the side frame 11 formed above the position of the rear torsion bar 340 and along the front-rear direction. When the sector gear 323 rotates, the front guide pin 324 moves forward or backward along the front guide hole 11b. Thus, the connection drive link 325 moves forward or backward, and the rear guide pin 326 also moves forward or backward within the rear guide hole 11c. Such movement causes a forward or backward tilt of the rear drive link 327 around the connection hole 327a, which then causes a twist of the rear torsion bar 340 connected to the connection hole 327a.

Reference numeral 370 represents a spiral spring that provides the upper rails 22, 22 with a force which energizes the cushion frame 3 (side frames 31, 31) upward to assist the cushion frame 3 in ascending.

The link mechanism 40 includes a pair of left and right front link mechanisms 410 and a pair of left and right rear link mechanisms 420. Each front link mechanism 410 includes a front fixed link 411, a frame-side front link 412, a first front movable link 413, and a second front movable link 414. The front fixed link 411 consists of a front bracket 4111 whose lower portion is mounted on a front portion of an upper rail 22 and an auxiliary bracket 4112 fixed to the front bracket 4111. A hole 413a formed in a front portion of the first front movable link 413 is rotatably pivotally supported by a shaft 4111a disposed on an upper portion of the front bracket 4111. On the other hand, a hole 414a formed in a front portion of the second front movable link 414 is rotatably pivotally supported by a shaft 4112a disposed on a lower portion of the auxiliary bracket 4112.

The frame-side front link 412 is fixed to the side frame 11 of the cushion frame 10 so as to protrude downward. An upper portion of the frame-side front link 412 has a penetration hole 412a, and a lower portion thereof is provided with a shaft 412b. A hole 414b formed in a rear portion of the second front movable link 414 is rotatably pivotally supported by the shaft 412b. On the other hand, a hole 413b formed in a rear portion of the first front movable link 413 is aligned with the penetration hole 412a formed in the upper portion of the frame-side front link 412.

While the above configuration is common to the left and right front link mechanisms 410, 410, the front link mechanisms are connected to the front torsion bar 330 in different manners. Specifically, around one side frame 11 having the lifter 30 disposed thereon, the one end 331 of the front torsion bar 330 is inserted in the aligned hole 413b of the rear portion of the first front movable link 413 and the penetration hole 412a of the upper portion of the frame-side front link 412 inside the one side frame 11 and then connected and fixed to the bearing 323a of the sector gear 323 having the rotation stop bush inserted therein outside the one side frame 11. Around the other side frame 11, the other end 332 of the front torsion bar 330 is connected and fixed to the rotation stop bush 413c inserted in the hole 413b of the rear portion of the first front movable link 413 (see FIG. 4) and rotatably inserted in the penetration hole 412a of the upper portion of the frame-side front link 412.

According to the above configuration, when the lifter 30 is operated, the sector gear 323 rotates and thus the one end 331 of the front torsion bar 330 is twisted using the other end 332 as a fixed end. On the other hand, if external vibration is inputted with the cushion frame adjusted to a predetermined height, the other end 332 of the front torsion bar 330 is twisted using the one end 331 as a fixed end and thus the vibration is absorbed.

The rear link mechanisms 420 each include a rear fixed link 421 whose lower portion is fixed to an upper rail 22 and which stands upward and a rear movable link 422 whose hole 422a near the front end is pivotally supported by a shaft 421a disposed on an upper portion of the rear fixed link 421. The rear movable link 422 has an approximately V shape having an obtuse interior angle, and the rear torsion bar 340 is supported by a portion closer to the rear end than an approximately central portion, of the rear movable link 422.

Specifically, around a rear link mechanism 420 close to the one side frame 11 having the lifter 30 disposed thereon, of the left and right rear link mechanisms 420, the one end 341 of the rear torsion bar 340 penetrates through the rear movable link 422 of the rear link mechanism 420 and the one side frame 11 and is connected and fixed to the connection hole 327a of the rear drive link 327 which is located outside the one side frame 11 and in which the rotation stop bush is inserted.

While the other end 342 of the rear torsion bar 340 only has to be relatively unrotatably connected to the rear movable link 422 close to the other side frame 11, the rear torsion bar 340 of the present embodiment is configured such that the elastic force thereof can be adjusted to a predetermined one. Specifically, a screw 350 having a predetermined length is disposed approximately in parallel with the rear torsion bar 340; the ends of the screw 350 are supported by the rear movable link 422; and a nut member 351 is disposed so as to be relatively displaced along the screw 350. The nut member 351 has an approximately oval shape. One end thereof has a female screw 351a that is screwed to the screw 350 and penetrates therethrough, and the other end thereof has a fitting hole 351b that unrotatably supports the rear torsion bar 340. When the screw 350 is rotated, the nut member 351 is relatively displaced in the length direction of the screw 350, and the position of the fitting hole 351b unrotatably fixing the rear torsion bar 340 is changed so as to follow the displacement. Thus, the actual elasticity exerted by twisting the rear torsion bar 340 can be adjusted. Since, in the present embodiment, the other end of the rear torsion bar 340 is fixed by the fitting hole 351b of the nut member 351, the fixed portion is defined as the other end 342. Reference sign 352 represents an approximately-oval-section cover pipe that surrounds the rear torsion bar 340, screw 350, and nut member 351 and is supported by the rear movable links 422, 422. The cover pipe 352 is disposed so as to fix the mounting angle of the nut member 351 to prevent the rotation of the nut member 351.

The rear movable link 422 disposed close to the one side frame 11 having the lifter 30 disposed thereon has an approximately arc long hole 422b in the rear end thereof. The rear guide pin 326 disposed on the rear end of the connection drive link 325 of the rotational force transmission mechanism 320 is fitted to the long hole 422b.

Figure 5:
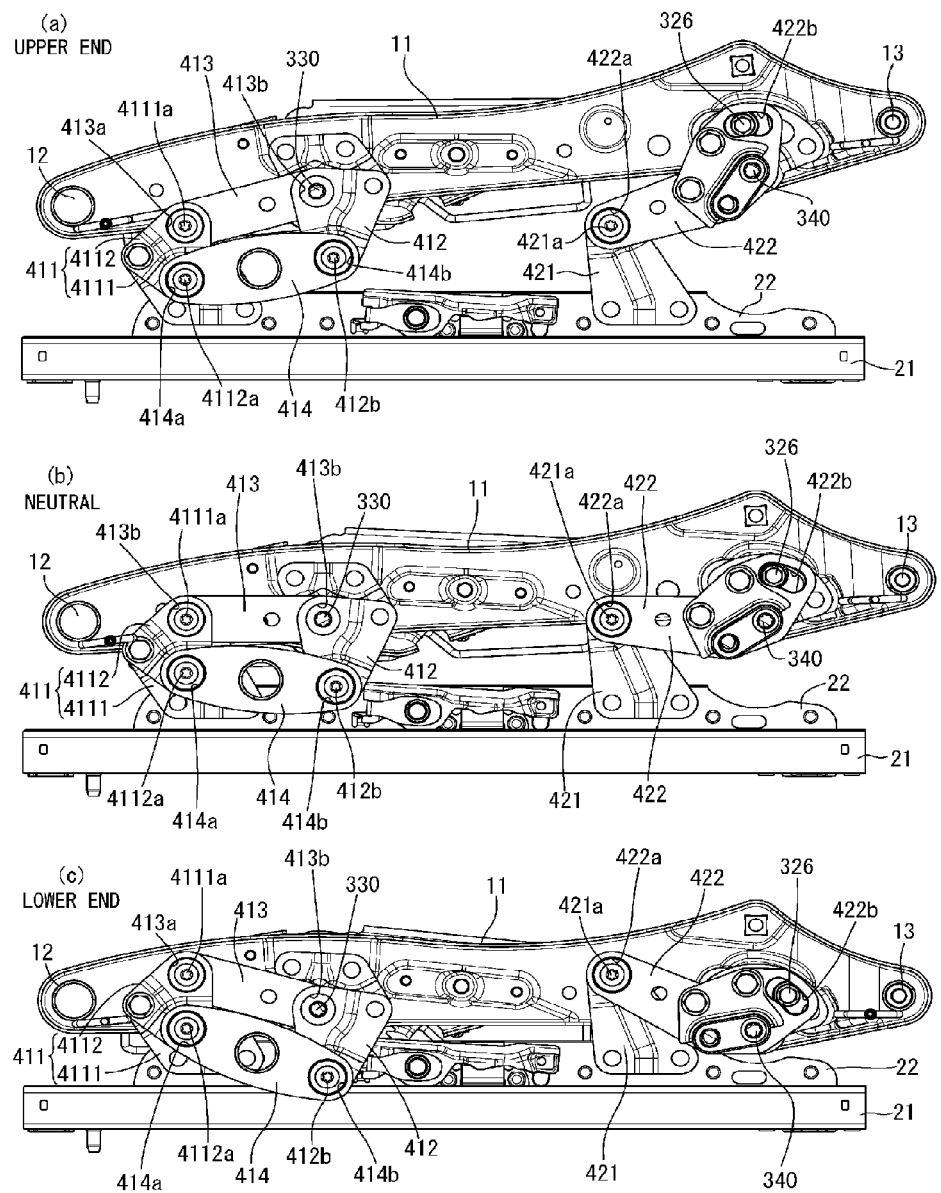
FIGS. 5(a) to 5(c) are drawings showing the operation of the first embodiment.
Figure 6:
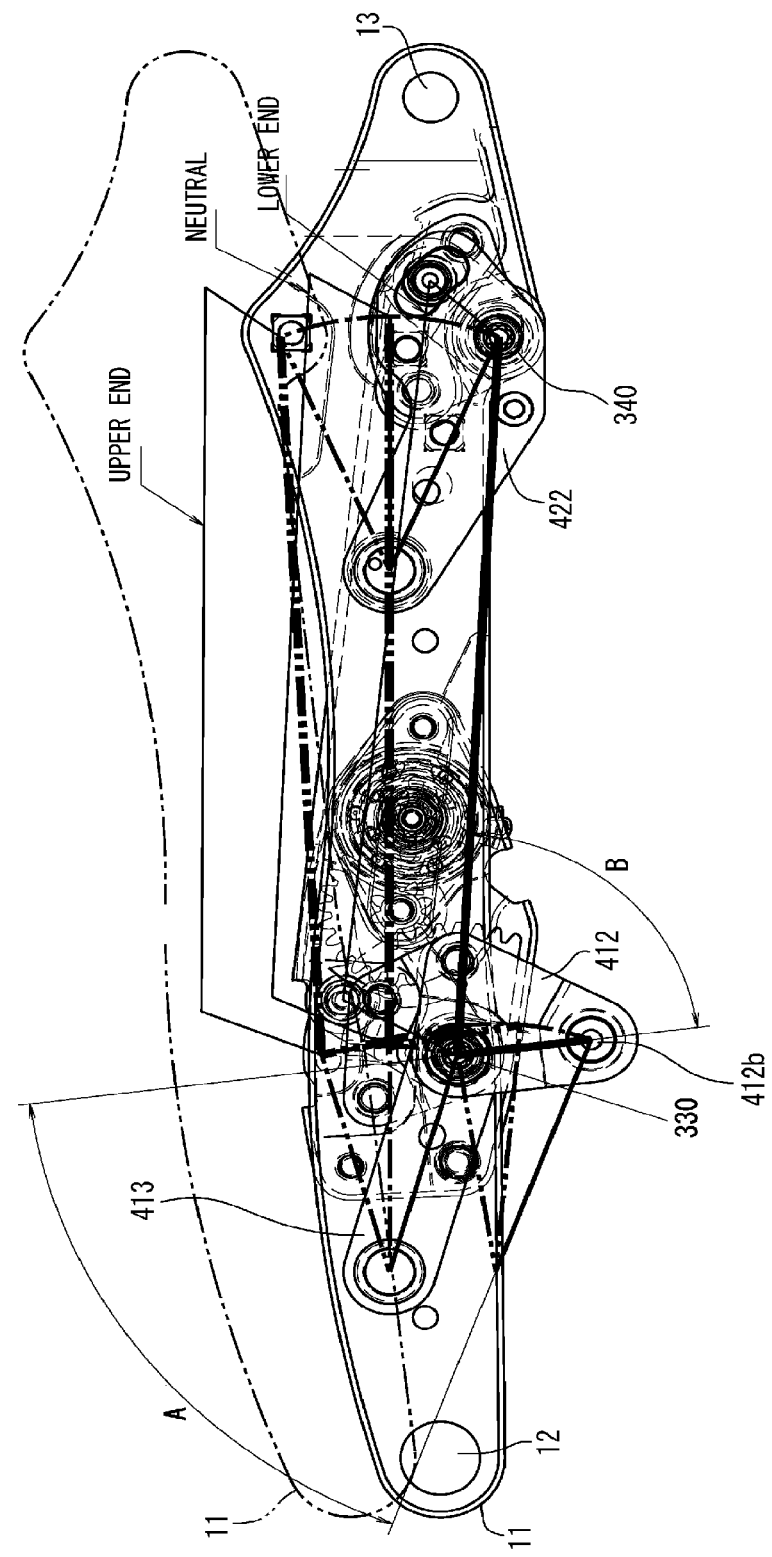
FIG. 6 is a drawing showing the operation of the first embodiment.

As described above, around the one side frame 11, the rear torsion bar 340 penetrates through the rear movable link 422 and the one side frame 11 so as to be rotatable relative to these components. In this case, it is preferable that a penetration hole 11d of the one side frame 11 be long in the front-rear direction. Thus, as shown in FIGS. 5 and 6, when the rear torsion bar 340 is displaced from the neutral position upward or downward, it is displaced forward. No matter to what height the rear torsion bar 340 is displaced from the neutral position, it is located behind the neutral position in a side view. Thus, the spring constant of the rear torsion bar 340 can be reduced.

Next, the operation of the present embodiment will be described. To adjust the height of the seat cushion (cushion frame 10), the user first rotates the operation member 314 of the clutch mechanism 310 of the lifter 30 forward or backward. The inputted rotational force is transmitted to the output gear 312a of the clutch mechanism 310 through the rotation controller 312. The rotation of the output gear 312a causes the rotation of the sector gear 323 through the first transmission gear 321 and second transmission gear 322 of the rotational force transmission mechanism 320. The rotation of the sector gear 323 causes the connection drive link 325 to move forward or backward, thereby rotating the rear drive link 327.

The rotation of the sector gear 323 also causes a twist of the one end 331 of the front torsion bar 330 connected to the bearing 323a using the other end 332 as a fixed end. On the other hand, the rotation of the rear drive link 327 causes a twist of the one end 341 of the rear torsion bar 340 connected to the connection hole 327a using the other end 342 as a fixed end.

For example, to raise the seat cushion from the neutral position shown in FIG. 5(b) to the upper end position shown in FIG. 5(a), the user rotates the operation member 314 in one direction. Thus, the front torsion bar 330 and rear torsion bar 340 are twisted in the one direction. Due to the elastic forces of the torsion bars, the rear ends of the first front movable link 413 and second front movable link 414 of the front link mechanism 410 are displaced upward around the front ends thereof, and the rear end of the rear movable link 422 of the rear link mechanism 420 is displaced upward around the front end thereof. On the other hand, to lower the cushion seat from the neutral position shown in FIG. 5(b) to the lower end position shown in FIG. FIG. 5(c), the user rotates the operation member 314 in a direction opposite to the above direction. Thus, the front torsion bar 330 and rear torsion bar 340 are twisted in the direction opposite to the above direction. Due to the elastic forces of the torsion bars, the rear ends of the first front movable link 413 and second front movable link 414 of the front link mechanism 410 are displaced downward around the front ends thereof, and the rear end of the rear movable link 422 of the rear link mechanism 420 is displaced downward around the front end thereof.

When the height is adjusted to a desired one, the seated person stops the operation of the operation member 314. While a rotational force from the output side is inputted to the output gear 312a through the rotational force transmission mechanism 320 due to the load of the seated person, external vibration, or the like, this rotational force is blocked by the rotation controller 312 of the clutch mechanism 310 and therefore is not transmitted to the input side. On the other hand, when external vibration is inputted during traveling, the cushion frame 1 is displaced relative to the upper rails 22, 22. This displacement prevents the rotation of the sector gear 323 and the rear drive link 327 of the lifter 30. Instead, along with the cushion frame 10, the first front movable link 413 rotates around the hole 413a pivotally supported by the front fixed link 411 fixed to the upper rail 22. Thus, the other end 332 of the front torsion bar 330 is twisted using the one end 331 as a fixed end, so that an elastic force is exerted. On the rear side, along with the cushion frame 10, the rear movable link 422 rotates relative to the rear fixed link 421. Thus, the other end 342 of the rear torsion bar 340 is also twisted using the one end 341 as a fixed end, so that a predetermined elastic force is exerted. The external vibration is absorbed by these elastic forces. No matter to any of the heights shown in FIGS. 5(a) to 5(c) the cushion frame 10 is adjusted, the front torsion bar 330 and rear torsion bar 340 exert the external vibration absorption function. That is, when adjusting the height of the cushion frame 10, the front torsion bar 330 and rear torsion bar 340 exert elasticity as components of the lifter 30 so that a lifting force raising or lowering the cushion frame 10 is exerted; when they are no longer functioning as the lifter 30 after the height of the cushion frame 10 is adjusted, the front torsion bar 330 and rear torsion bar 340 function as suspensions that exert elasticity that absorbs vibration.

In the present embodiment, the front link mechanism 410 and rear link mechanism 420 are independent of each other. As shown in FIG. 6, an angle A formed by a line extending from the shaft 412b located in the lower portion of the frame-side front link 412 and having the hole 414b of the second front movable link 414 pivotally supported thereby in a direction in which the line comes into contact with the lower surface of the front pipe of the cushion frame 10 and a line extending from the shaft 412b in a direction toward the front torsion bar 330 is set to an acute angle. An angle B formed by a line extending from the front torsion bar 330 in a direction toward the shaft 412b and a line extending from the front torsion bar 330 in a direction toward the rear torsion bar 340 is also set to an acute angle. Thus, when the person is seated on the seat cushion deeply so that the back of the person comes into contact with the seat back, in other words, when the person is seated in such a manner that the hip point is aligned with the design reference position, the front link mechanism 410 and rear link mechanism 420 are brought into balance and thus the cushion frame 10 vertically move in parallel. On the other hand, when the person is seated in such a manner that the center of gravity of the person moves forward, for example, in order to operate the pedal, the front link mechanism 410 moves more largely than the rear link mechanism 420 and thus a front portion of the cushion frame 10 sinks more deeply. Thus, the person can easily operate the pedal.

Figure 7:
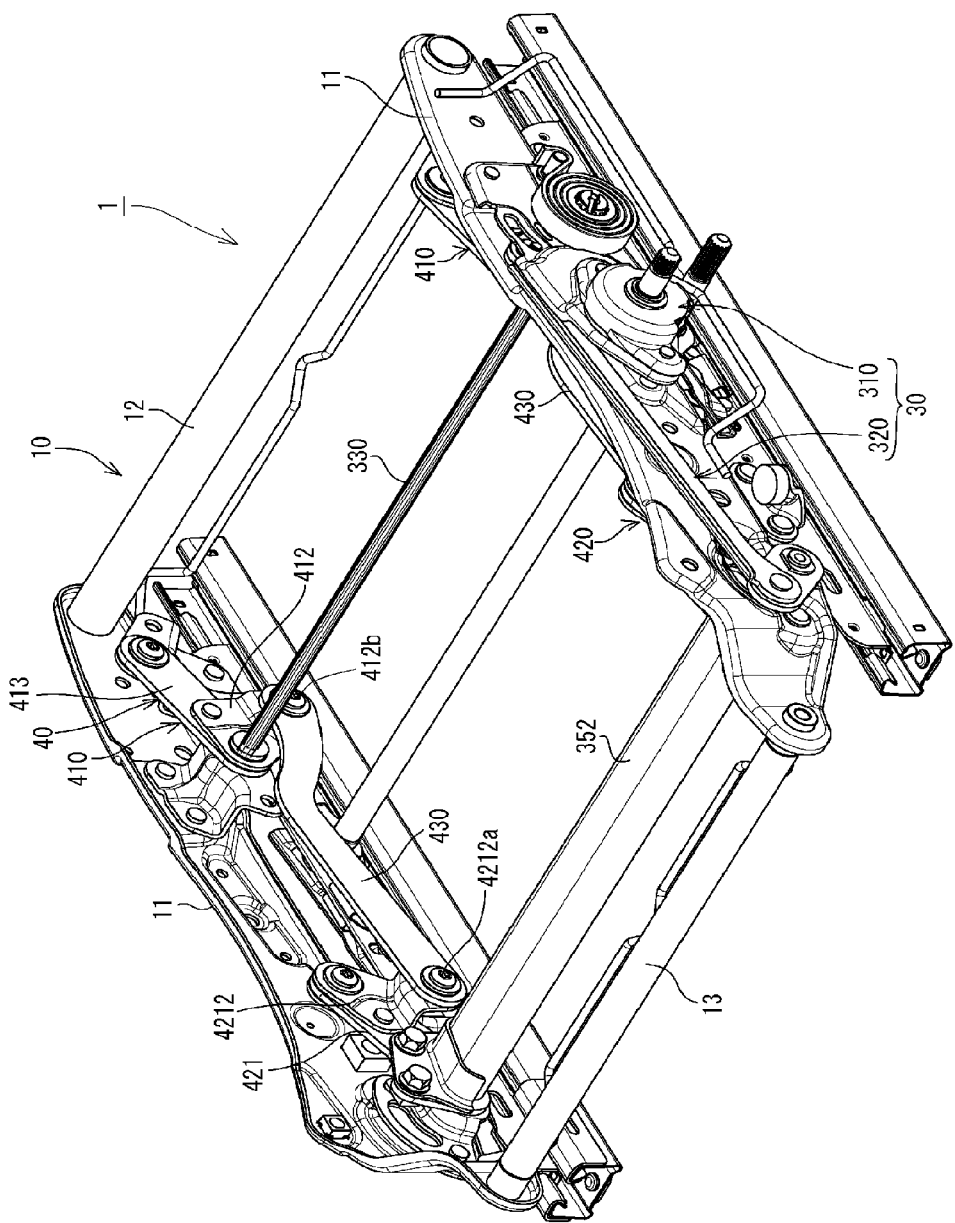
FIG. 7 is a perspective view showing a cushion frame, a lifter, a link mechanism, and the like, which are major parts of a seat support mechanism of a second embodiment of the present invention, seen from the rear.
Figure 8:
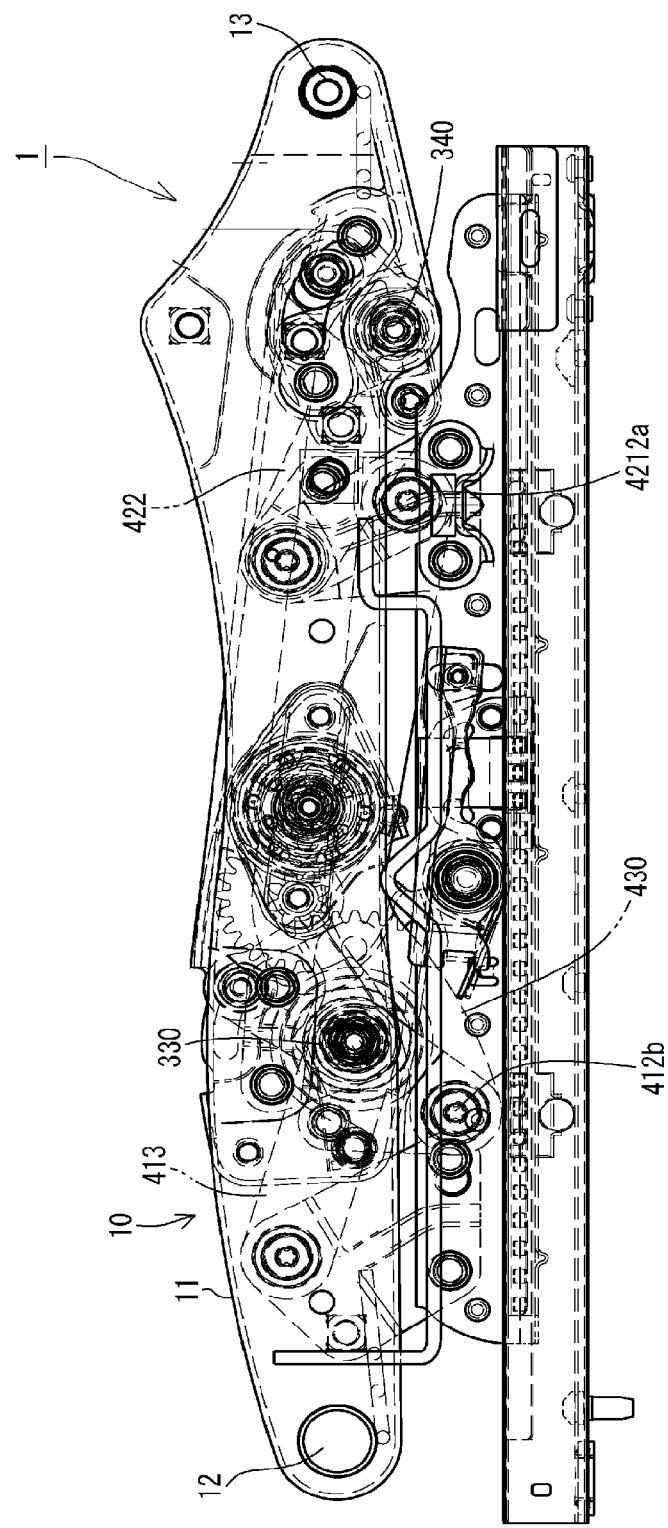
FIG. 8 is a side view of FIG. 7.
Figure 9:
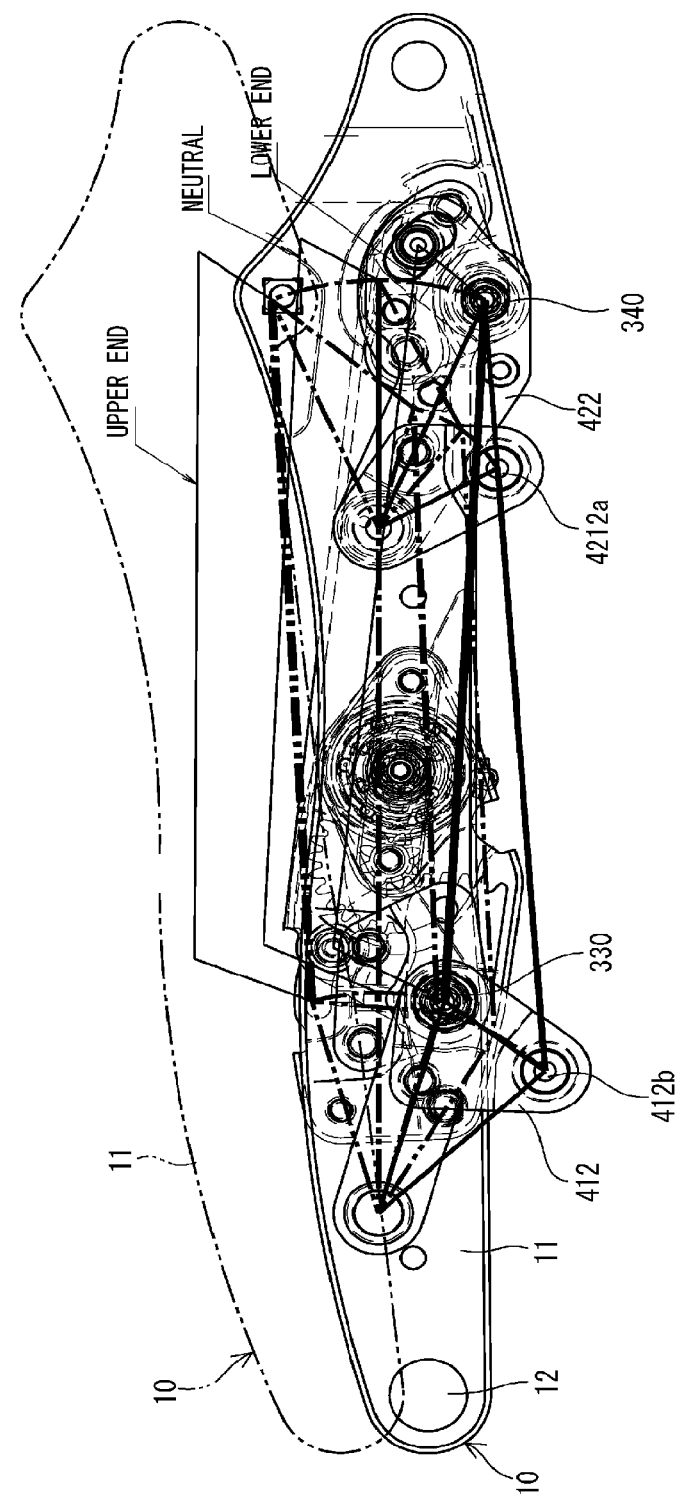
FIG. 9 is a drawing showing the operation of the second embodiment.

FIGS. 7 to 9 are drawings showing major parts of a seat support mechanism 1 of a second embodiment of the present invention. The seat support mechanism 1 of the present embodiment differs from that of the first embodiment in that a link mechanism 40 has a different configuration. Unlike in the first embodiment, a front link mechanism 410 does not include a second front movable link 414 pivotally supported by a shaft 412b located in a lower portion of a frame-side front link 412 and a shaft 4112a disposed in a lower portion of an auxiliary bracket 4112 of a front fixed link 411. Instead, in a rear link mechanism 420 of the present embodiment, an auxiliary bracket 4212 whose lower portion is provided with a shaft 4212a is mounted on a rear fixed link 421 whose lower portion is fixed to an upper rail 22 and which stands upward. Also, a front-rear connection movable link 430 extends between the shaft 412b located in the lower portion of the frame-side front link 412 of the front link mechanism 410 and the shaft 4212a of the rear fixed link 421 of the rear link mechanism 420. Of course, the front-rear connection movable link 430 includes left and right front-rear connection movable links 430 extending between left and right front link mechanisms 410, 410 and left and right rear link mechanisms 420, 420.

A method for adjusting the height using a lifter 30 of the present embodiment is similar to that of the first embodiment. Also, as in the first embodiment, vibration can be absorbed by the elasticity of a front torsion bar 330 and a rear torsion bar 340 no matter at what height a cushion frame 10 is located. Note that the present embodiment includes the front-rear connection movable links 430 and therefore the cushion frame 10 moves vertically in parallel when adjusting the height, when external vibration is inputted, or when changing the attitude for a pedal operation or the like, no matter in what position the person is seated (see FIG. 9).

Figure 10:
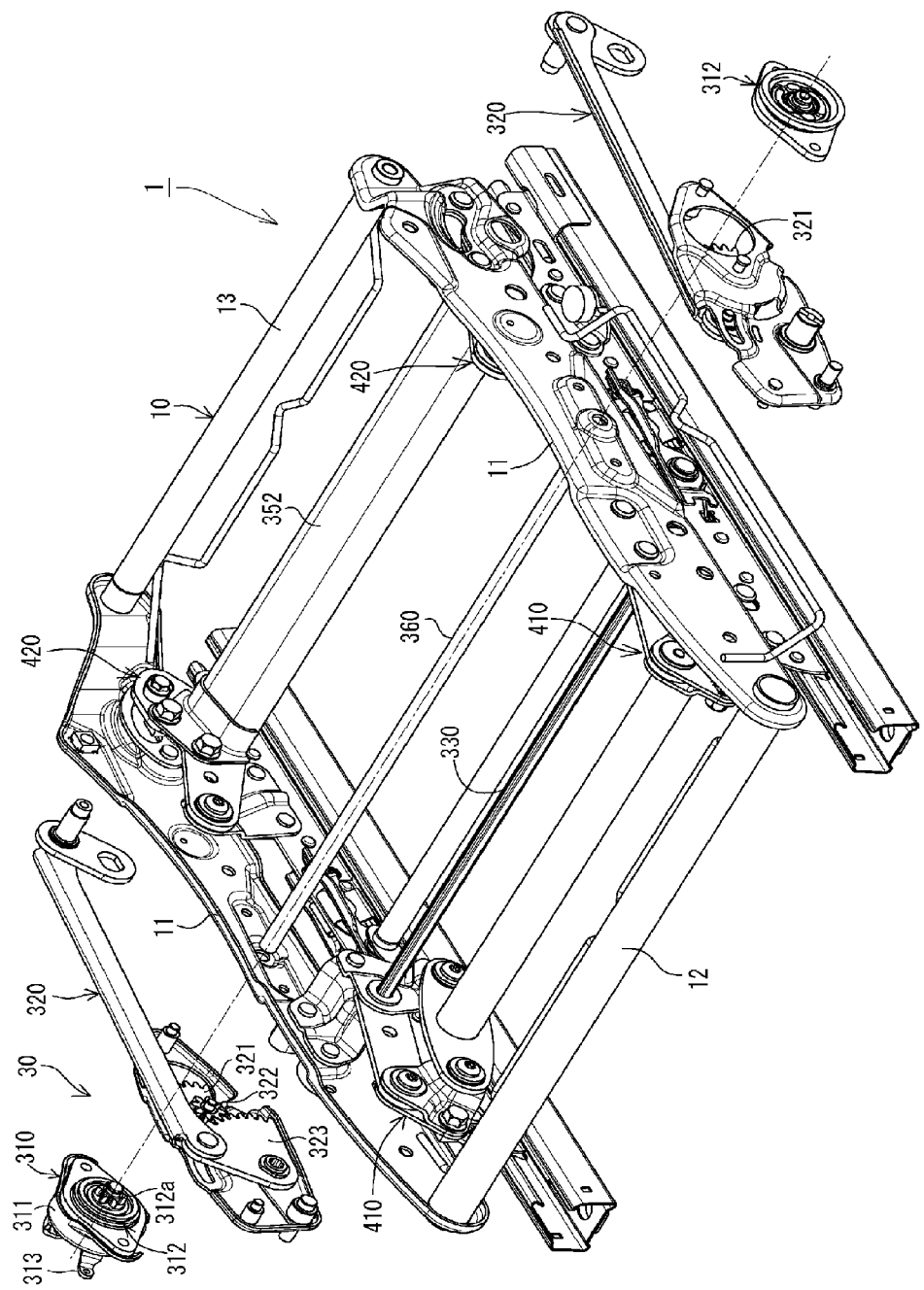
FIG. 10 is a perspective view showing an aspect where rotation transmission mechanisms are disposed on both sides of a structure of the first embodiment seen from the front.

In the above embodiment, only one side frame 11 is provided with the lifter 30 including the clutch mechanism 310 and rotational force transmission mechanism 320. However, as shown in FIG. 10, the other side frame 11 may be provided with a structure including a rotation controller 312 that transmits a rotational force from an operation member 314 and blocks a rotational force from the opposite direction, of a clutch mechanism 310 and a rotational force transmission mechanism 320 that operates in connection with an output gear 312a of the rotation controller 312. Also, the rotation controllers 312 disposed on the one and other side frames 11, 11 may be connected using a left-right connection rod 360, and the rotational force transmission mechanisms 320 on both sides may be operated synchronously to increase strength.

Figure 11:
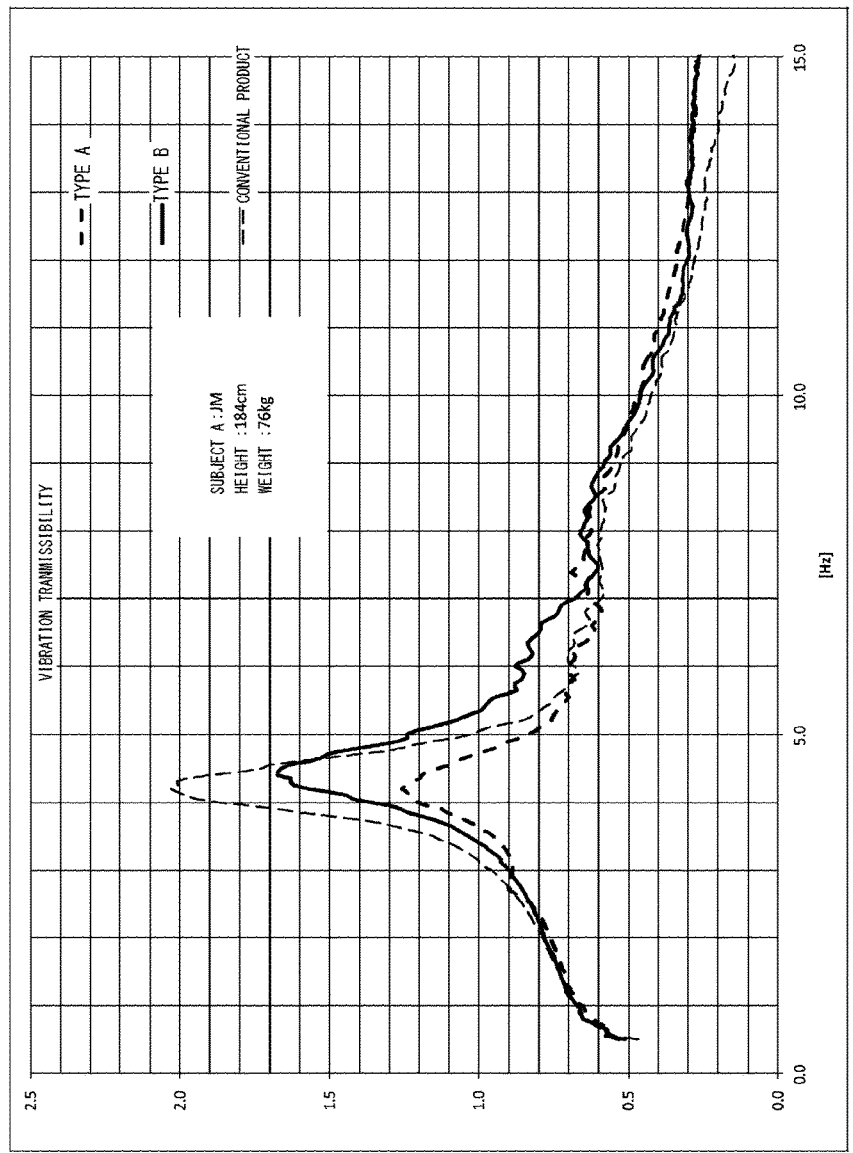
FIG. 11 is a graph showing the measurement results of the vibration transmissibility of subject A.
Figure 12:
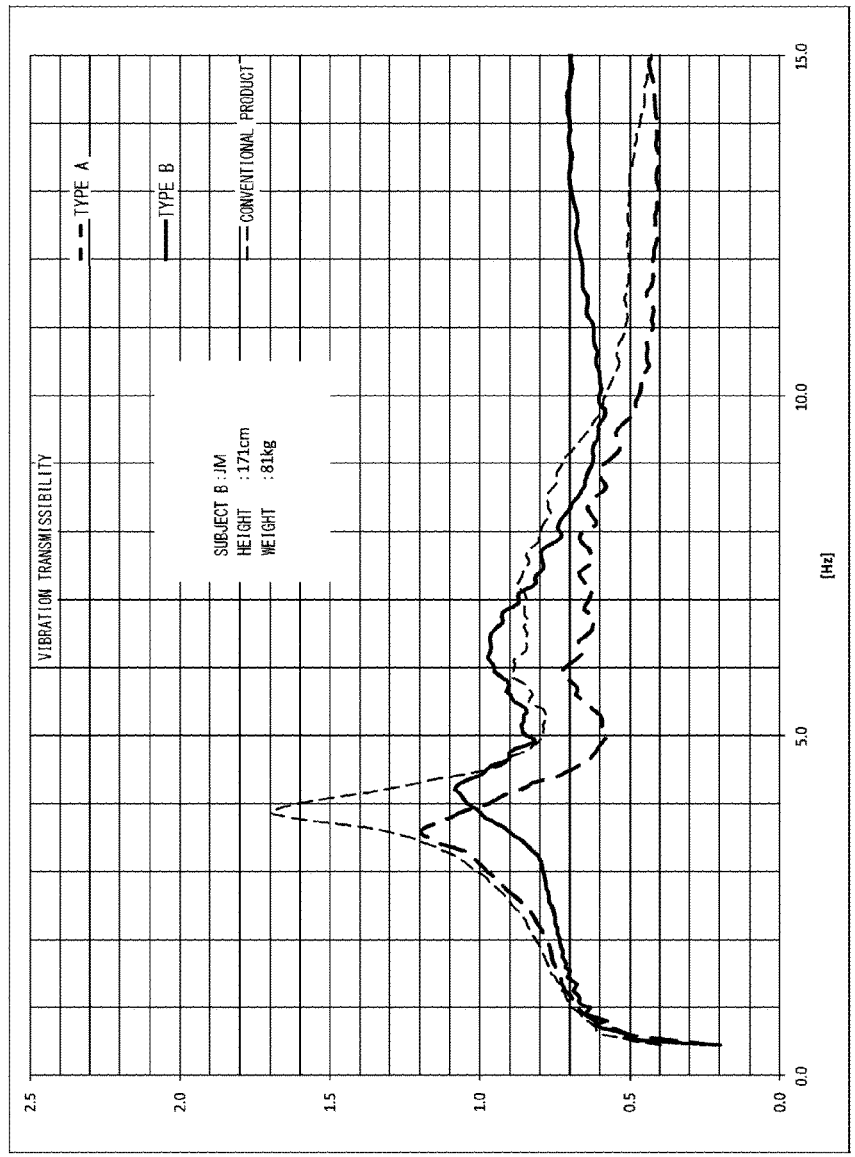
FIG. 12 is a graph showing the measurement results of the vibration transmissibility of subject B.
Figure 13:
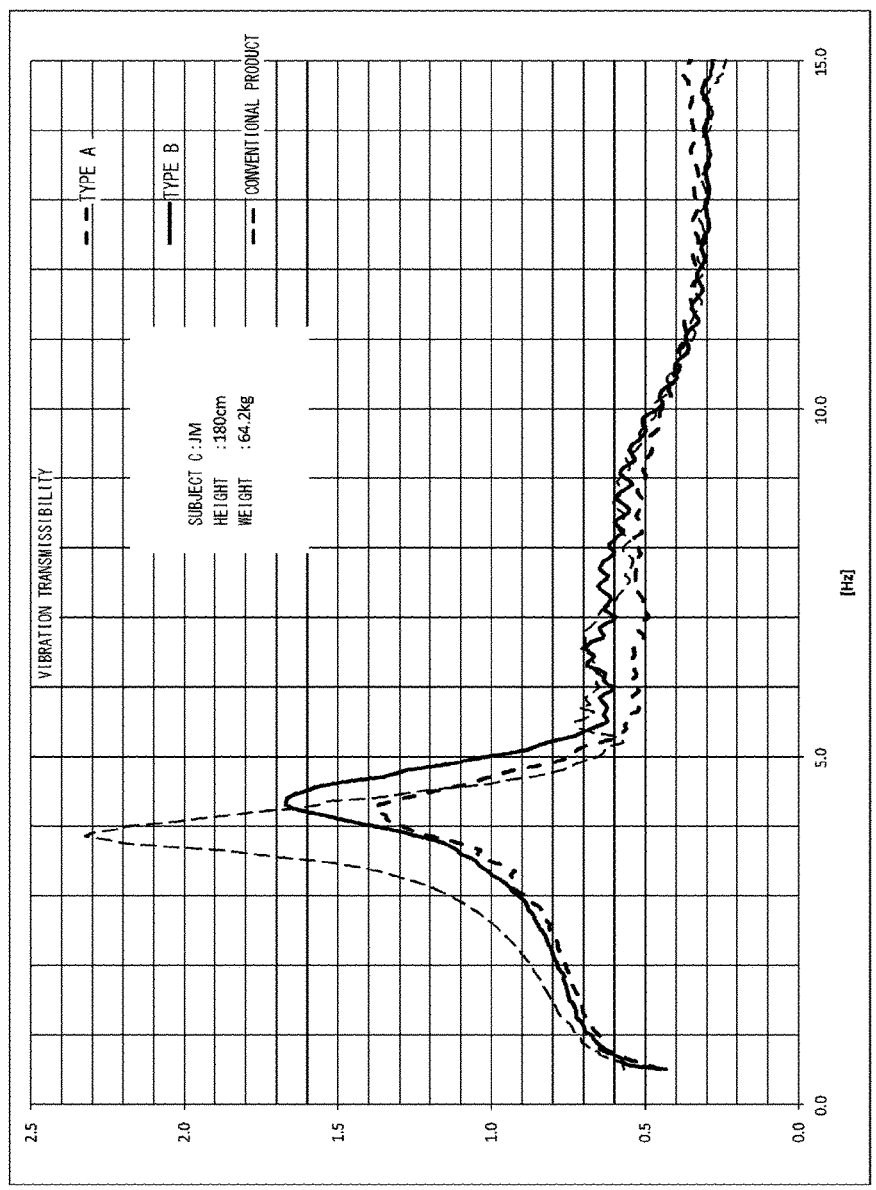
FIG. 13 is a graph showing the measurement results of the vibration transmissibility of subject C.

FIGS. 11 to 13 show the measurement results of the vibration transmissibility of a seat structure (type A) including the cushion frame 10 using the seat support mechanism 1 of the first embodiment, that is, the independent-suspension cushion frame 10 in which the front link mechanisms 410 and rear link mechanisms 420 are independent of each other and a seat structure (type B) including the cushion frame 10 using the seat support mechanism 1 of the second embodiment, that is, the cushion frame 10 in which the front link mechanisms 410 and rear link mechanisms 420 are connected by the connection movable links 430. A cushion member formed of a 55 mm-thick urethane material was supported on each cushion frame 10; each subject was seated on the cushion member; these were set on the stage of a vibrator; and then a measurement was made. The vibration conditions were as follows: Z-axis uniaxial vibration was generated by a sinusoidal log sweep having a frequency range of 0.5 to 15 Hz, a half amplitude of 1 mm, and a sweep time of 180 s. The subjects were three Japanese males (JM) (subject A, subject B, subject C), and the measurement results of the subjects are shown in FIGS. 11 to 13.

These diagrams reveal that the vibration transmissibilities of the resonance peaks of types A and B of the first and second embodiments were much lower than that of a typical vehicle seat that does not include the front torsion bar or rear torsion bar of the present invention and is simply provided with a 70 mm-thick urethane material. The measurement results of subjects A and C in FIGS. 11 and 13 indicate that the vibration transmissibility of the resonance peak of type A of the first embodiment was significantly lower than that of type B. The measurement results of subject B in FIG. 12 indicate that while the vibration transmissibility of the resonance peak of type B was lower than that of type A, the frequency at which the resonance peak of type A appeared was lower than that of type B and that the vibration transmissibility of type A was generally lower than that of type B in a range of 5 Hz or more. The reason seems that the front link mechanisms 410 and rear link mechanisms 420 were not connected together in type A and thus a phase difference occurred therebetween, producing a damping effect.

As is apparent in these measurement results, according to the seat support mechanisms 1 of the above embodiments, the front torsion bar 330 and rear torsion bar 340 are connected to the lifter 30 and thus the vertical height can be adjusted using the elasticity thereof. Also, after adjusting the height to a predetermined one, the front torsion bar 330 and rear torsion bar 340 function as suspensions. Thus, the need to provide a dedicated suspension mechanism independent of the lifter is eliminated, allowing a compact, low-cost seat structure to be provided.

While the above embodiments use the two torsion bars disposed in the front-rear direction, any one thereof may function as both a lifter and a suspension. Of course, the use of the two torsion bars as described in the above embodiments is preferable in terms of load resistance performance and vibration absorption function.

Figure 14:
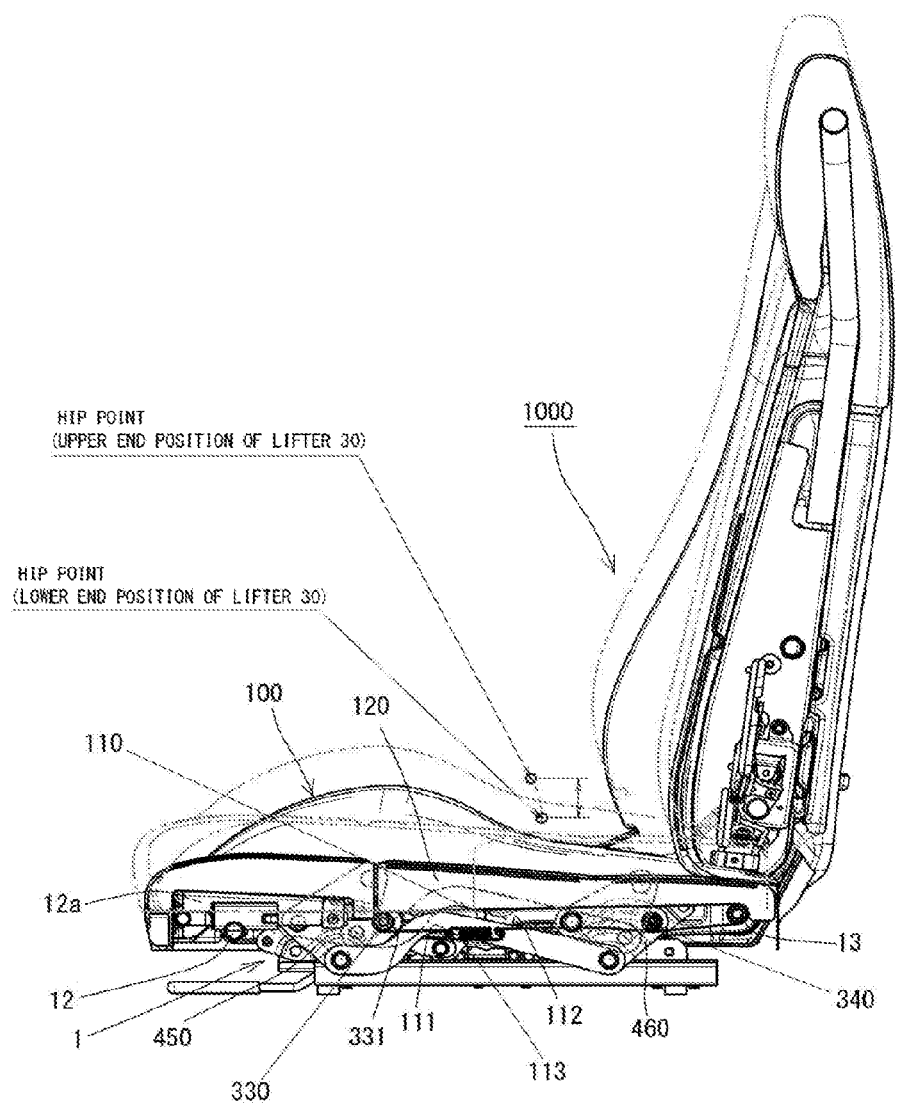
FIG. 14 is a sectional view showing an embodiment of a seat structure of the present invention.

FIG. 14 is a sectional view showing an embodiment of a seat structure 1000 that uses, as a seat cushion 100, the cushion frame 10 including the seat support mechanism 1 of the second embodiment, that is, the cushion frame 10 where the front link mechanisms 410 and rear link mechanisms 420 are connected by the connection movable links 430, as well as are provided with a base net 110 and a cushion member 120 disposed so as to cover the base net 110. In the above embodiments, the front torsion bar 330 is disposed such that the rotational force thereof is transmitted to the approximately rectangular first front movable links 413, and the rear torsion bar 340 is disposed such that the rotational force thereof is transmitted to the approximately V-shaped rear movable links 422; in the present embodiment, front movable links 450 and rear movable links 460 both having approximately triangular shapes are used to simplify the configuration. Note that the approximately triangular front movable links 450 and rear movable links 460 perform functions similar to those of the first front movable links 413 and rear movable links 422 of the above embodiments.

The base net 110 of the present embodiment extends between frame members disposed at a predetermined distance in the front-rear direction of the cushion frame 10, that is, between the front torsion bar 330 and a rear frame 13. Note that the front torsion bar 330 is covered by a cover pipe 331. For this reason, the front edge 111 of the base net 110 extends from the upper side to the lower side of the cover pipe 331; the rear edge 112 extends from the upper side to the lower side of the rear frame 13; and the front edge 111 and rear edge 112 are connected by a coil spring 113, which is a spring member. The base net 110 may be a two-dimensional fabric or a three-dimensional fabric (e.g., a three-dimensional knitted fabric).

The base net 110 is covered by the cushion member 120. The cushion member 120 may be a urethane material, a three-dimensional fabric (preferably, a three-dimensional knitted fabric), a multilayer body consisting of a urethane material and a three-dimensional fabric, or the like. In the present embodiment, a front frame 12 is provided with a front-edge support 12a, and the cushion member 120 is disposed on the front-edge support 12a, base net 110, and rear support frame 13.

According to the present embodiment, the seat cushion 100 is provided with the base net 110 whose front edge 111 and rear edge 112 are connected by the coil spring 113. Thus, the front torsion bar 330 and rear torsion bar 340, and the coil spring 113 are arranged in series. Thus, the entire spring constant is reduced and the vibration absorption function is increased compared to when only the front torsion bar 330 and rear torsion bar 340 are provided. In addition, the elastic force of the base net 110 works. As a result, the resonance peak is moved to a lower frequency range and thus the vibration transmissibility is reduced. Also, the function of absorbing high-frequency-range micro-vibration always inputted during traveling is improved. Also, the coil spring 113 improves the stroke feeling during a seating operation.

A two-dimensional fabric was used as the base net 110; the front edge 111 and rear edge 112 thereof were connected by the coil spring 113; a 20 mm-thick cushion member formed of a urethane material was supported on the base net 110; a subject was seated on the cushion member; these were set on the stage of a vibrator, and then vibration transmissibility was measured. The vibration conditions were as follows: Z-axis uniaxial vibration was generated by a sinusoidal log sweep having a frequency range of 0.5 to 15 Hz, a half amplitude of 1 mm, and a sweep time of 180 s. The subject was a Japanese male (subject D) having a weight of 100 kg. The measurement results are shown in FIG. 15.

Figure 15:
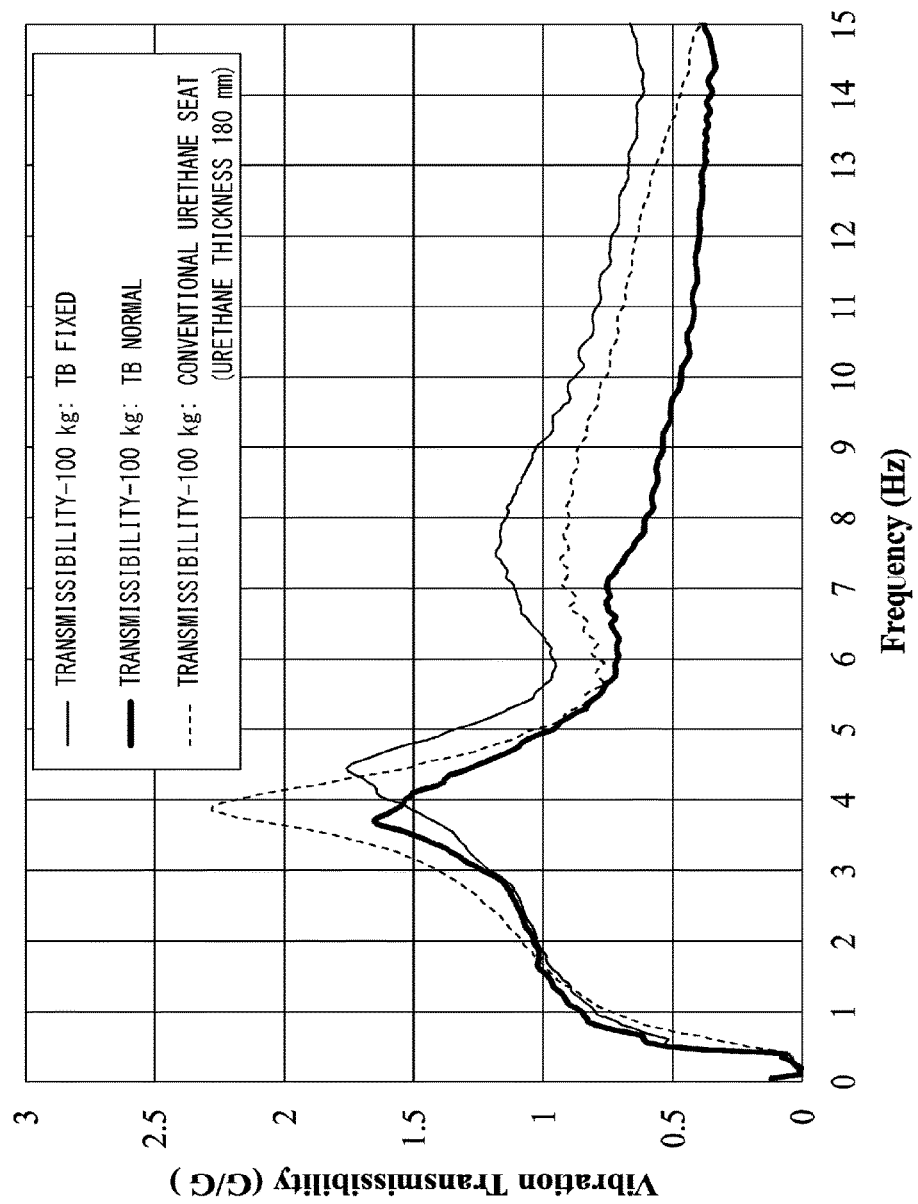
FIG. 15 is a graph showing the measurement results of the vibration transmissibility of subject D.

In FIG. 15, a thick solid line (TB normal) represents the measurement results of the seat structure 1000 of the present embodiment. A thin solid line (TB fixed) represents the measurement results when the front torsion bar 330 and rear torsion bar 340 were fixed so that the elasticity thereof does not work. A broken line (a conventional urethane seat) represents the measurement results when there was used a conventional vehicle seat which is simply provided with a front torsion bar, a rear torsion bar, and a 180 mm-thick urethane material that does not include a base net. FIG. 15 indicates that the seat structure 1000 of the present embodiment exhibited different vibration absorption characteristics from those of the front and rear torsion bars-fixed seat structure in a frequency range of 4 Hz or more owing to the effect of the torsion bars. FIG. 15 also indicates that the seat structure 1000 of the present embodiment exhibited different resonance characteristics from those of the conventional seat, as well as reduced the gain of the resonance peak, although it did not have a damper function. Accordingly, the use of the front torsion bar and rear torsion bar is very useful to improve the vibration transmissibility.

Figure 16:
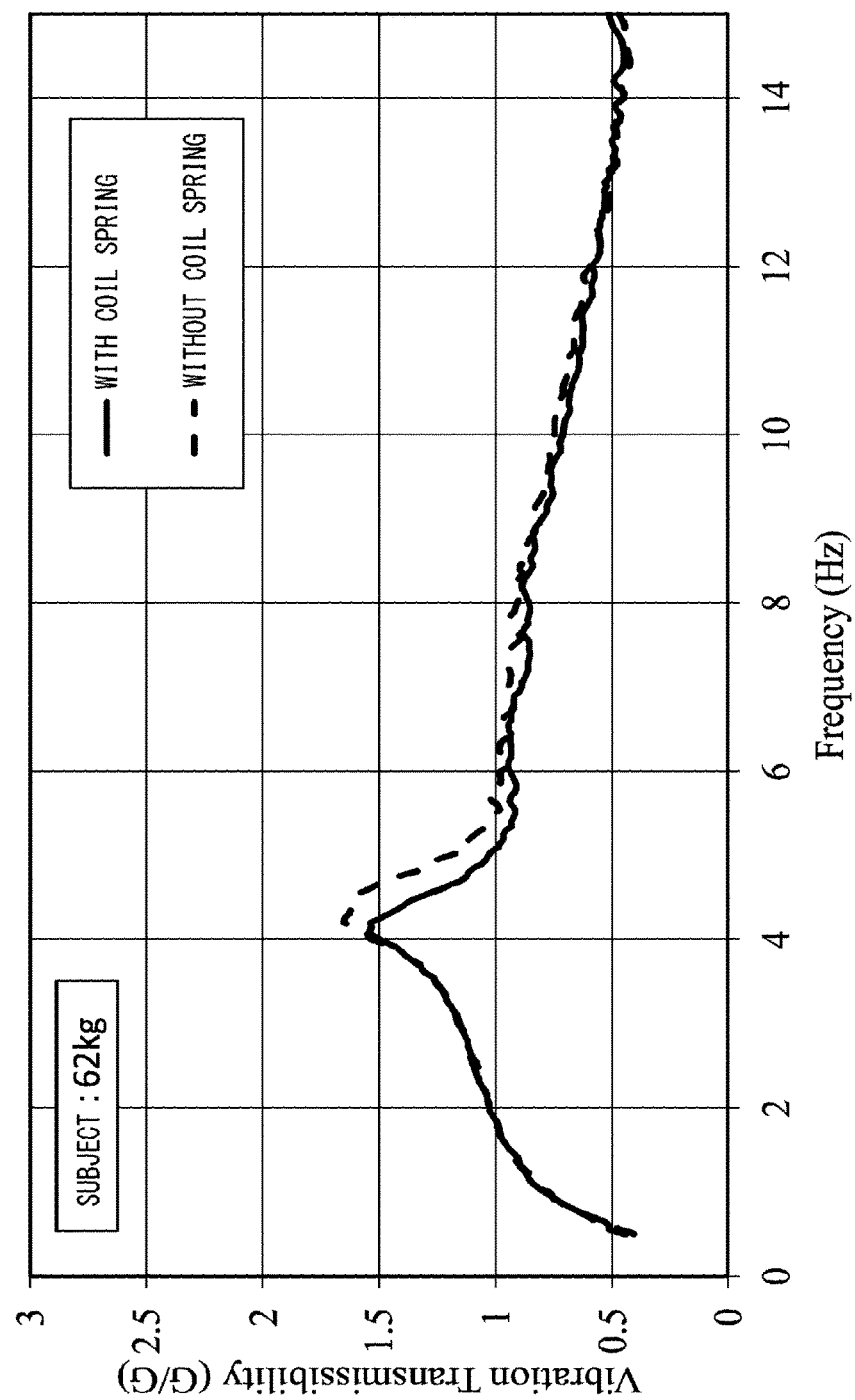
FIG. 16 is a graph showing the measurement results of the vibration transmissibility of subject E.

FIG. 16 is a diagram showing the vibration transmissibility measured with a Japanese male having a weight of 62 kg (subject E) seated on the seat structure 1000 of the present embodiment used in the test of FIG. 15 and on the same conditions as those of FIG. 15 ("with coil spring" in FIG. 16). In FIG. 16, the vibration transmissibility is compared with that of a structure obtained by removing the coil spring 113 and connecting the front edge 111 and rear edge 112 of the base net 110 using a fabric which has almost no expandability and is close to a rigid body ("without coil spring" in FIG. 16). The other elements were the same between these structures, and the front torsion bar 330 and rear torsion bar 340 were set so that the elasticity thereof works.

FIG. 16 reveals that the resonance peak of the seat structure 1000 of the present embodiment, "with coil spring," moved to the low frequency side and the vibration transmissibility thereof at higher frequencies than that of the resonance peak was reduced compared to that of the seat structure "without coil spring" and that the use of the coil spring 113 of the present embodiment is effective in improving vibration transmission characteristics.

Figure 17:
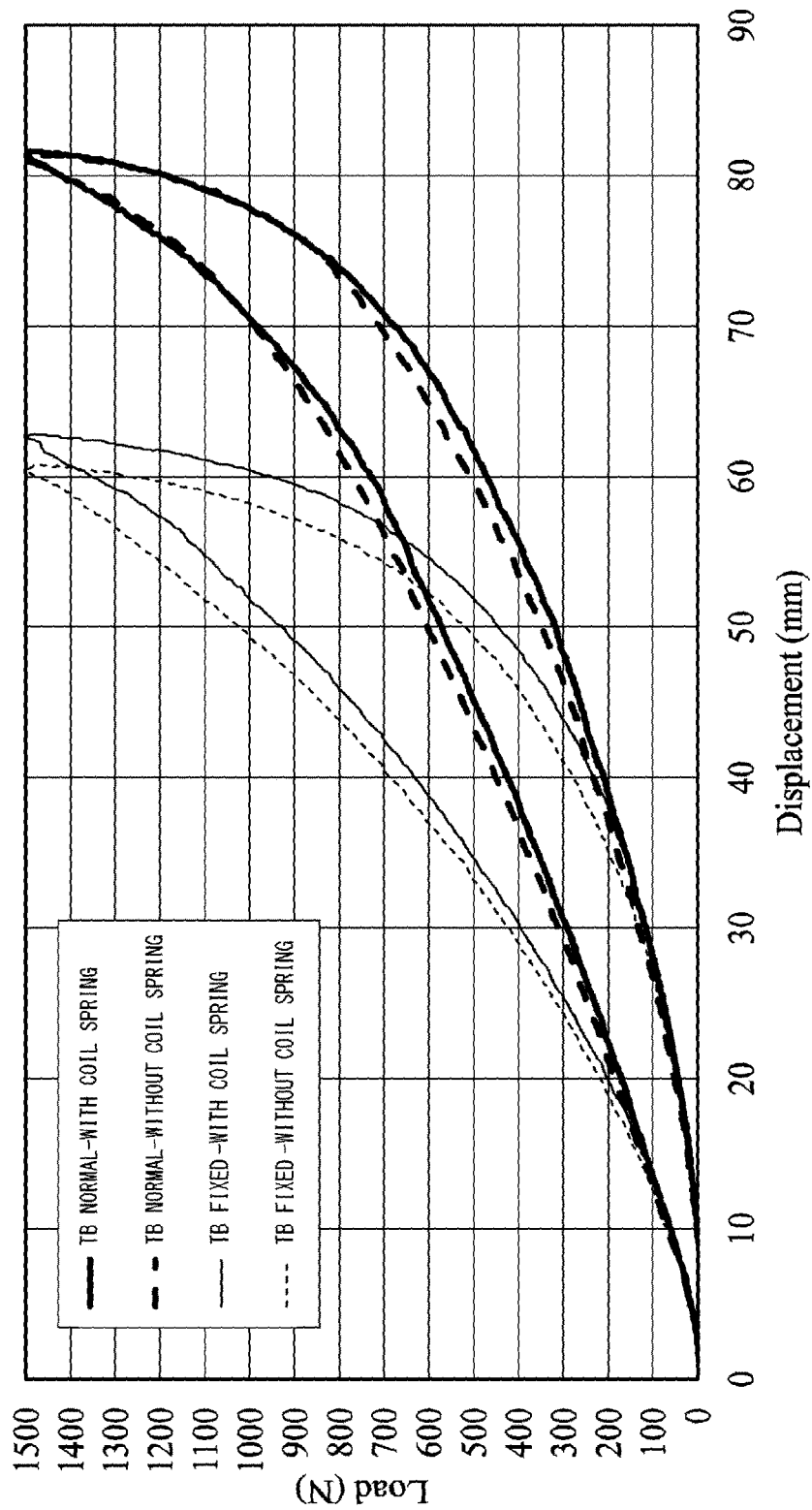
FIG. 17 is a graph showing the results of a static load characteristics test.

A static load characteristics test was performed on the seat structure 1000 of the present embodiment, "with coil spring," and the seat structure "without coil spring" used in the test shown in FIG. 16 in such a manner that the center of a 200 mm-diameter pressure plate was set below the design hip point and the seat structures are pressed with a load of up to 1500 N at a speed of 4.5 mm/sec. The results are shown in FIG. 17. In FIG. 17, "TB normal" represents the measurement results when the front torsion bar 330 and rear torsion bar 340 were set so as to function as usual; "TB fixed" represents the measurement results when the front torsion bar 330 and rear torsion bar 340 were fixed so that the elasticity thereof does not work.

FIG. 17 reveals that the spring constant of the seat structure 1000 of "TB normal-with coil spring" of the present embodiment was lower than that of the seat structure of "TB normal-without coil spring" when the load was in a range of up to 1000 N and, in particular, it was significantly lower when the load applied to the seat cushion 100 was in a normal range (up to around 800 N) and that the front torsion bar 330 and rear torsion bar 340, and the coil spring 113 worked in series. These contribute to the improvement in the vibration transmissibility of the seat structure 1000 of "with coil spring" shown in FIG. 16.

Further, a comparison between data about the two "TB fixed" seat structures and data about the two "TB normal" seat structures reveal that the spring constants of the two "TB normal" seat structures were significantly lower than those of the "TB fixed" seat structures and that the use of the front torsion bar 330 and rear torsion bar 340 significantly contributed to the improvement in the stroke feeling and the improvement in the vibration removal performance.

Figure 18:
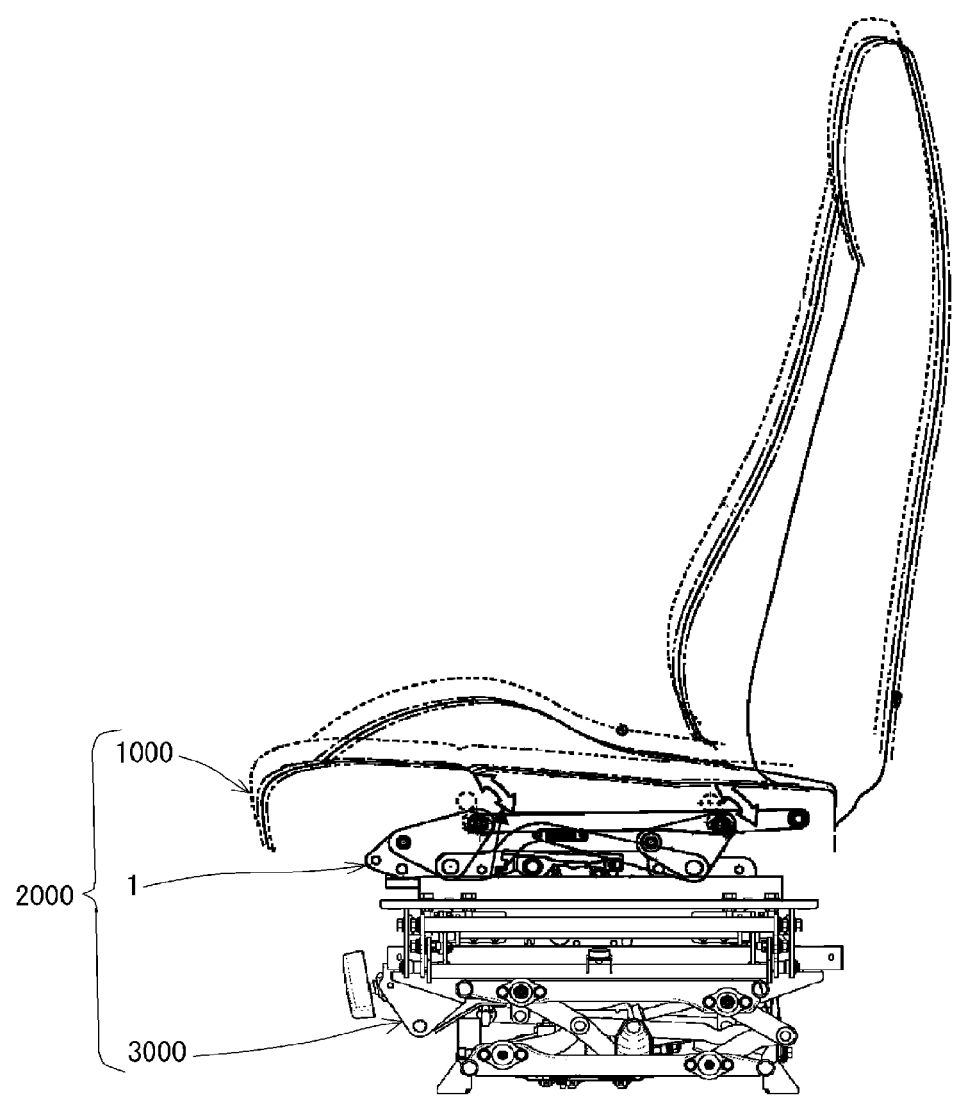
FIG. 18 is a schematic configuration drawing showing an embodiment of a suspension seat of the present invention.

Next, an embodiment of a suspension seat 2000 will be described with reference to FIGS. 18 to 28. As shown in FIG. 18, the suspension seat 2000 has a structure where the seat structure 1000 shown in FIG. 14 is fixed to an upper portion of a suspension mechanism 3000.

Figure 19:
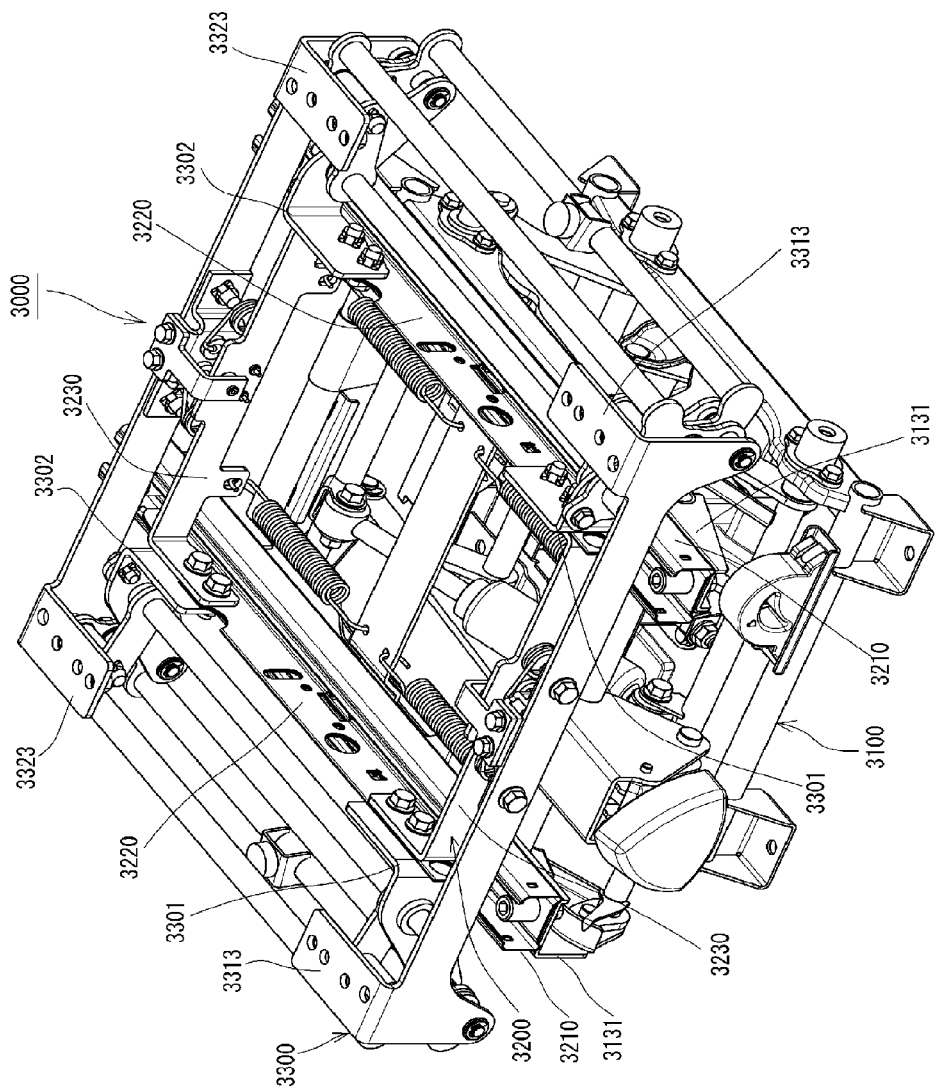
FIG. 19 is a perspective view showing a suspension mechanism used in the embodiment of FIG. 18.
Figure 20:
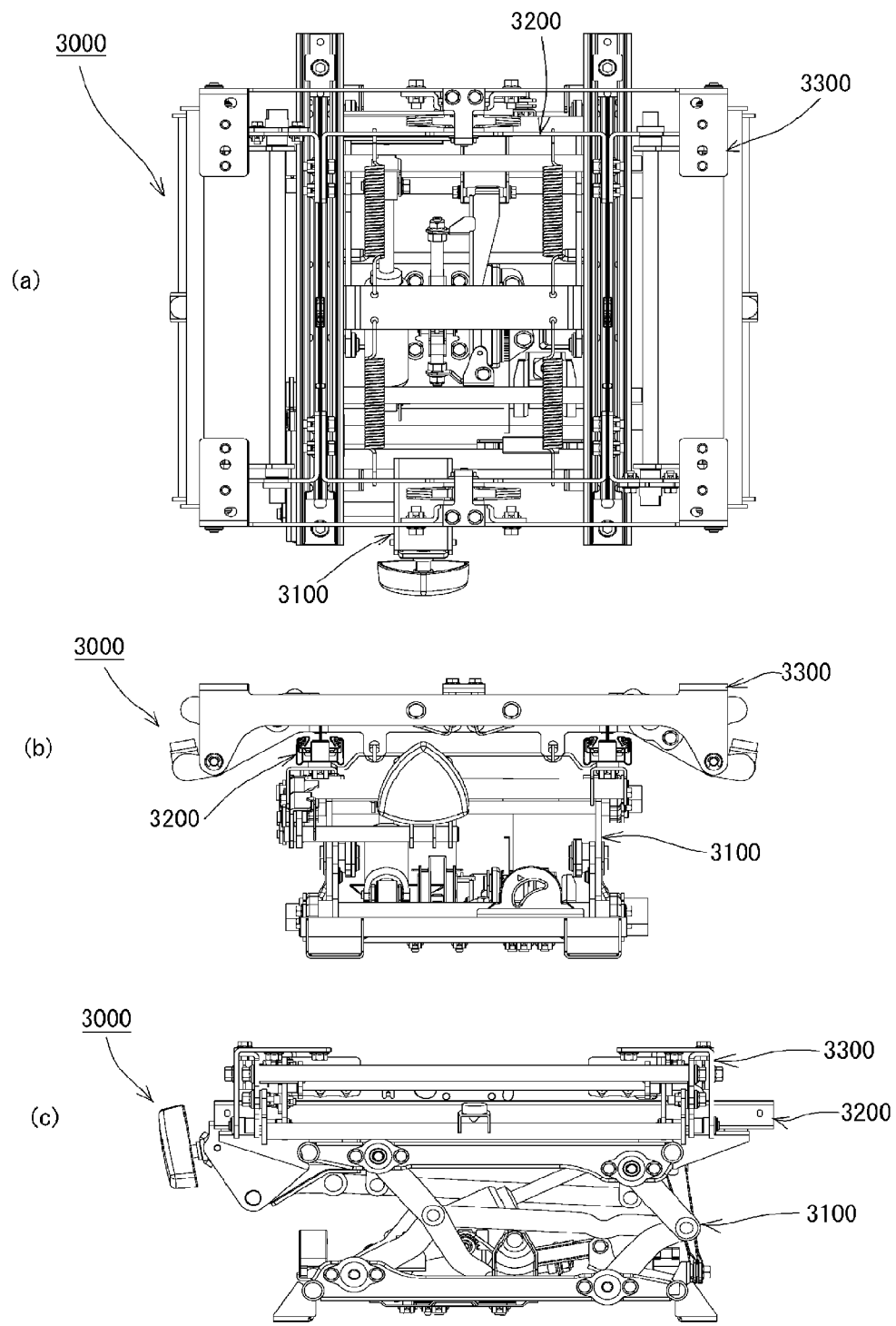
FIG. 20(a) is a plan view of the suspension mechanism shown in FIG. 19.
FIG. 20(b) is a front view of FIG. 20(a)
FIG. 20(c) is a side view of FIG. 20(a).

As shown in FIGS. 19 and 20, the suspension mechanism 3000 used in the present embodiment is a triaxial suspension obtained by combining a vertical suspension 3100, a front-rear suspension 3200, and a left-right suspension 3300.

Figure 21:
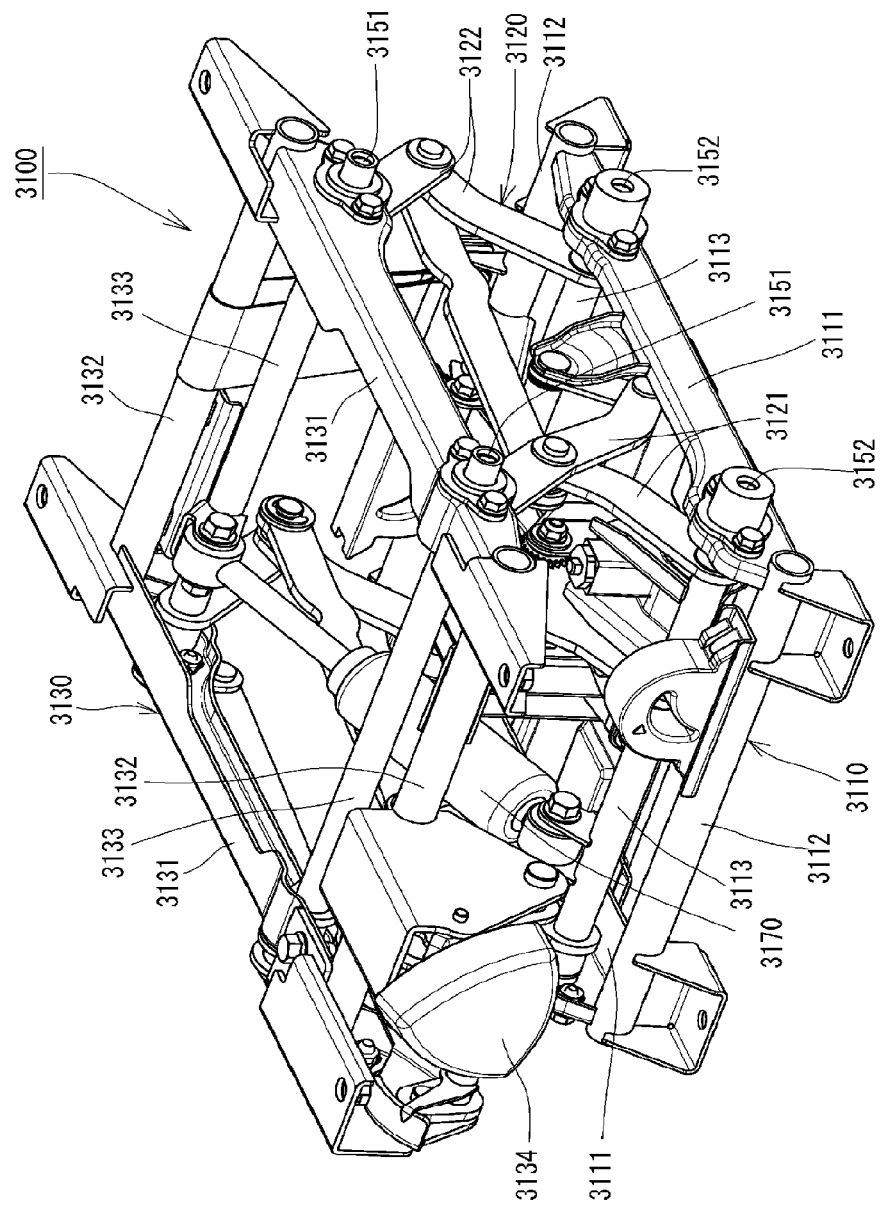
FIG. 21 is a perspective view showing a vertical suspension used in the suspension mechanism.
Figure 22:
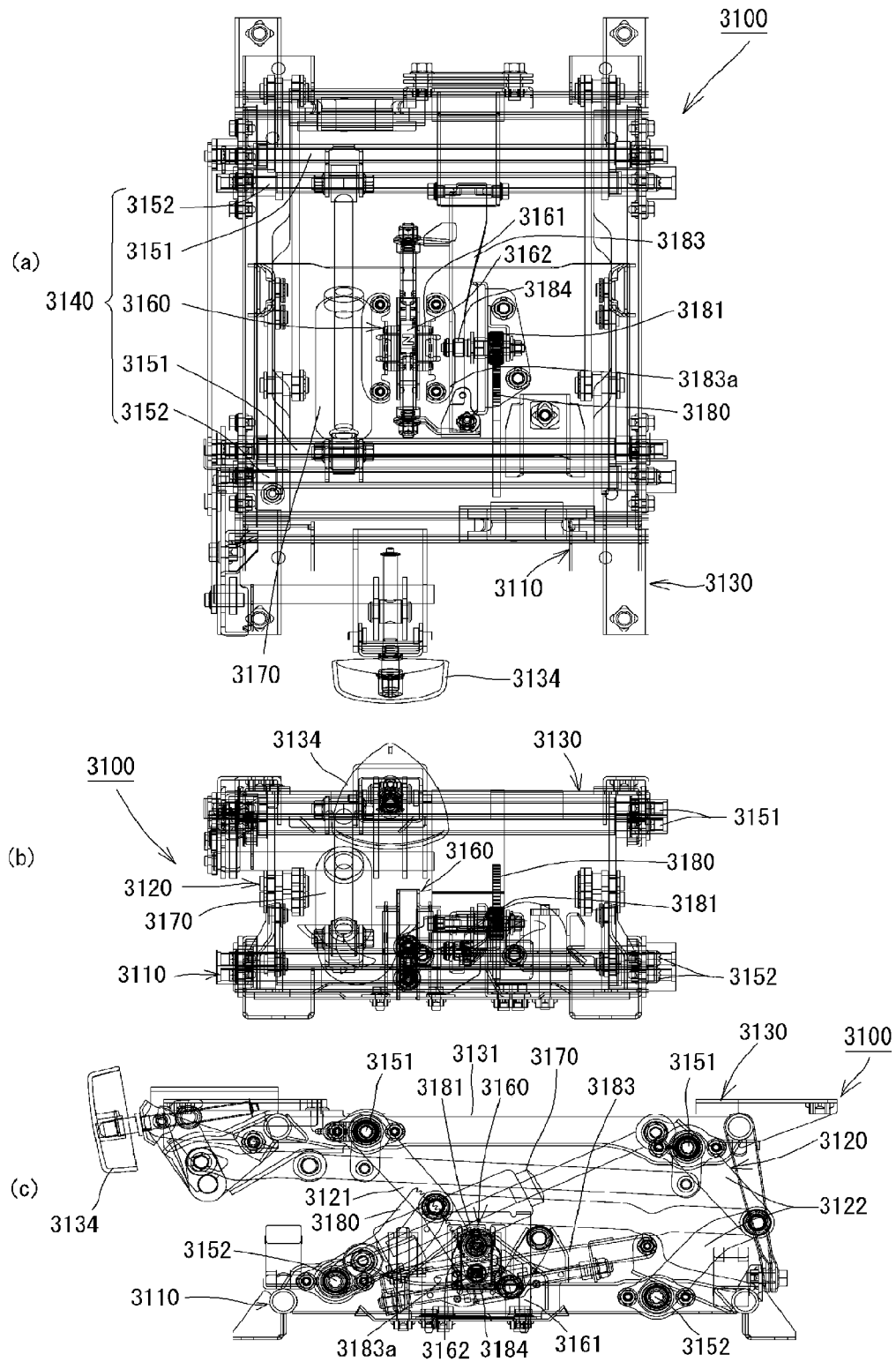
FIG. 22(a) is a plan view of the vertical mechanism shown in FIG. 21.
FIG. 22(b) is a front view of FIG. 22(a)
FIG. 22(c) is a side view of FIG. 22(a).

As shown in FIGS. 21 and 22, the vertical suspension 3100 includes a lower frame body 3110, an upper frame body 3130, and a spring mechanism 3140. The lower frame body 3110 is fixed to a vehicle floor or the like, has an approximately square frame shape in a plan view, and includes left and right side frames 3111, 3111, connection frames 3112, 3112 extending between the side frames 3111, 3111 so as to be close to front and rear portions of the connection frames 3112, 3112. The upper frame body 3130 is disposed so as to be vertically movable relative to the lower frame body 3110 with a parallel link mechanism 3120 therebetween, has an approximately square frame shape in a plan view, and includes a pair of side frames 3131, 3131 and connection frames 3132, 3132 extending between the side frames 3131, 3131 so as to be close to front and rear portions of the side frames 3131, 3131. The spring mechanism 3140 elastically supports the upper frame body 3130 with respect to the lower frame body 3110.

The spring mechanism 3140 includes two spring mechanisms: a spring mechanism having a positive spring constant and a spring mechanism having a negative spring constant. The spring mechanism 3140 has a constant load region where when a positive spring constant is superimposed in a range where a negative spring constant functions, the superimposed spring constant becomes substantially zero (see FIG. 31). It has a high function of blocking the transmission of vibration from the vehicle floor to the upper frame body 3130.

In the present embodiment, the torsion bars 3151, 3151, 3152, 3152 are inserted in tubular front and rear rotary shafts 3133, 3133 disposed adjacent to the connection frames 3132, 3132 of the upper frame body 3130 and tubular front and rear rotary shafts 3113, 3113 disposed adjacent to the connection frames 3112, 3112 of the lower frame body 3110. The respective ends are connected to the rotary shafts 3113, 3113. A front link 3121 of the parallel link mechanism 3120 is connected to the front rotary shafts 3133, 3113, and a rear link 3122 is connected to the rear rotary shafts 3133, 3113. Thus, the torsion bars 3151, 3151, 3152, 3152 form a spring mechanism that energizes the upper frame body 3130 in a direction in which the upper frame body 3130 is raised and that has a positive spring constant.

The spring mechanism having a negative spring constant consists of a magnetic spring 3160. The magnetic spring 3160 includes a fixed unit 3161 and a movable unit 3162. The fixed unit 3161 is fixed to the lower frame body 3110 and includes a pair of fixed permanent magnets disposed at a predetermined distance. The front rotary shaft 3113 of the lower frame body 3110 has one end of a sector gear 3180 connected thereto, as well as is provided with a gear 3181 engaged with the sector gear 3180. An oscillating member 3183 for a movable unit is disposed so as to be pivotally supported by a bracket close to a rear portion of the lower frame body 3110 and to be able to oscillate vertically. The oscillating member 3183 for a movable unit has a long hole 3183a. A roller 3184 rotatably disposed on a shaft on one end of a support plate (not shown) is disposed in the long hole 3183a. A shaft disposed on the other end of the support plate is supported by a bracket, as well as has the gear 3181 mounted thereon. The movable unit 3162 is supported by the oscillating member 3183 for a movable unit. The movable unit 3162 includes a movable permanent magnet that moves between the pair of fixed permanent magnets of the fixed unit 3161.

According to the above configuration, when the upper frame body 3130 is vertically displaced relative to the lower frame body 3110, the front rotary shaft 3113 of the lower frame body 3110 rotates. Thus, the sector gear 3180 moves rotationally, and the oscillating member 3183 for a movable unit vertically oscillates through the gear 3181 and roller 3184. As a result, the movable permanent magnets of the movable unit 3162 move vertically, thereby changing the positions thereof relative to the fixed permanent magnets. At this time, due to the magnetic forces of the permanent magnets, negative spring constant characteristics that the applied load is reduced as the amount of displacement is increased are indicated in a predetermined displacement range (see FIG. 31). In the present embodiment, the roller 3184 is rotated through the support plate provided with the sector gear 3180 and the gear 3181 engaged with the sector gear 3180 and thus the oscillating member 3183 for a movable unit oscillates. As a result, even if the movable range of the spring mechanism is small, larger displacement can be absorbed by the then lever ratio setting. The vertical suspension 3100 has a configuration approximately similar to that disclosed in Japanese Unexamined Patent Application Publication No. 2009-248798 filed by the present applicant. In the vertical suspension 3100, the movable permanent magnets of the movable unit 3162 are displaced vertically. However, other configurations may be used. For example, the fixed permanent magnets of the fixed unit 3161 may be disposed approximately horizontally and thus the movable permanent magnets may be displaced approximately horizontally, as disclosed in Japanese Unexamined Patent Application Publication No. 2010-179719 or 2010-179720 proposed by the present applicant.

In the present embodiment, the initial amount of torsion of the torsion bars 3151, 3151, 3152, 3152 can be adjusted by rotating a dial 3134. This configuration is made by considering the weight difference. By adjusting the initial amount of torsion of the torsion bars 3150, 3150, the spring constant becomes substantially zero in a predetermined displacement range, whether the weight is high or low.

Further, in the vertical suspension 3100, a damper 3170 such as an oil damper is disposed between the upper frame body 3130 and lower frame body 3110. This is intended to, if impulsive vibration is inputted, damper that energy.

Figure 23:
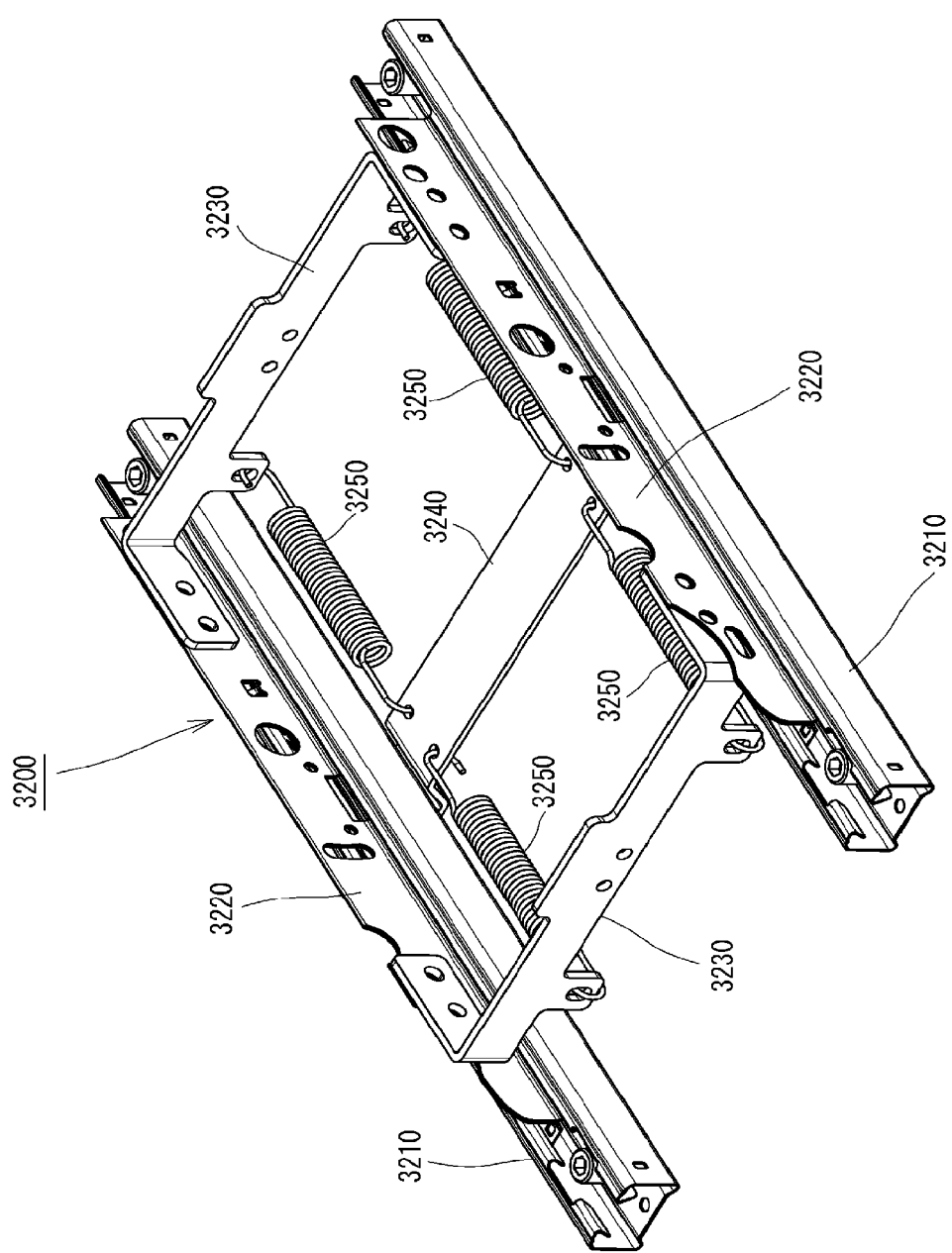
FIG. 23 is a perspective view showing a front-rear suspension used in the suspension mechanism.
Figure 24:
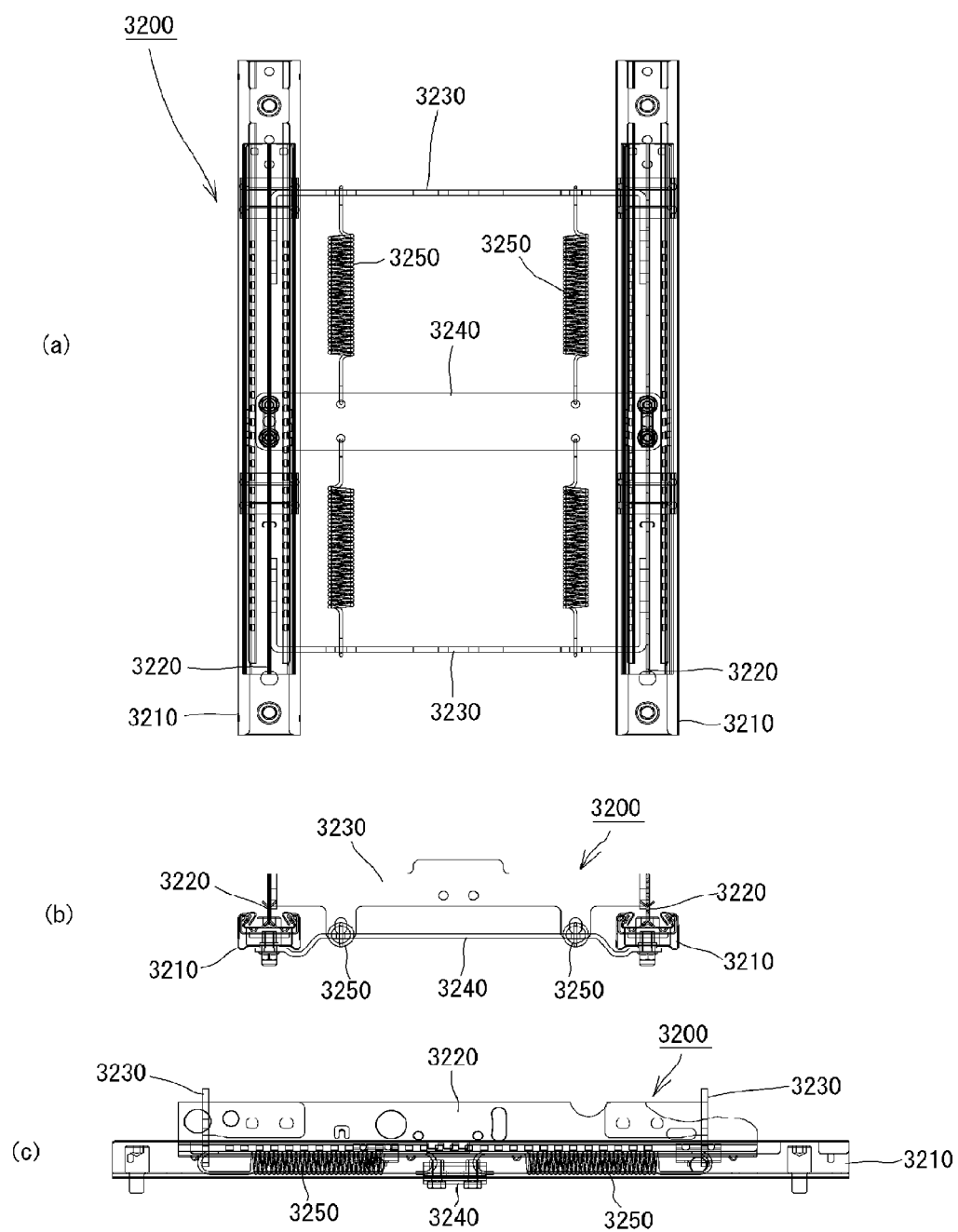
FIG. 24(a) is a plan view of the front-rear mechanism shown in FIG. 23.
FIG. 24(b) is a front view of FIG. 24(a)
FIG. 24(c) is a side view of FIG. 24(a).

As shown in FIGS. 23 and 24, the front-rear suspension 3200 includes a pair of left and right fixed rails 3210, 3210 disposed at a predetermined distance, movable rails 3220, 3220 disposed so as to be slidable in the front-rear direction relative to the fixed rails 3210, 3210, movable connection frames 3230, 3230 extending between front portions of the movable connection frames 3230, 3230 and extending between rear portions thereof, a fixed connection frame 3240 extending between the pair of left and right fixed rails 3210, 3210 around the midpoint between the movable connection frames 3230, 3230 disposed in the front-rear direction, and multiple coil springs 3250 extending between the fixed connection frame 3240 and one movable connection frame 3230 and multiple coil springs 3250 extending between the fixed connection frame 3240 and the other movable connection frame 3230.

The fixed rails 3210, 3210 of the front-rear suspension 3200 are fixed to the pair of side frames 3131, 3131 of the upper frame body 3130 of the vertical suspension 3100 so as to form multiple layers (see FIG. 19). When vibration is inputted in the front-rear direction, the movable rails 3220, 3220 are displaced in the length direction thereof relative to the fixed rails 3210, 3210. This displacement expands or contracts the coil springs 3250 between the fixed connection frame 3240 and front-side movable connection frame 3230 and between the fixed connection frame 3240 and rear-side movable connection frame 3230. Thus, the vibration inputted in the front-rear direction is removed.

Figure 25:
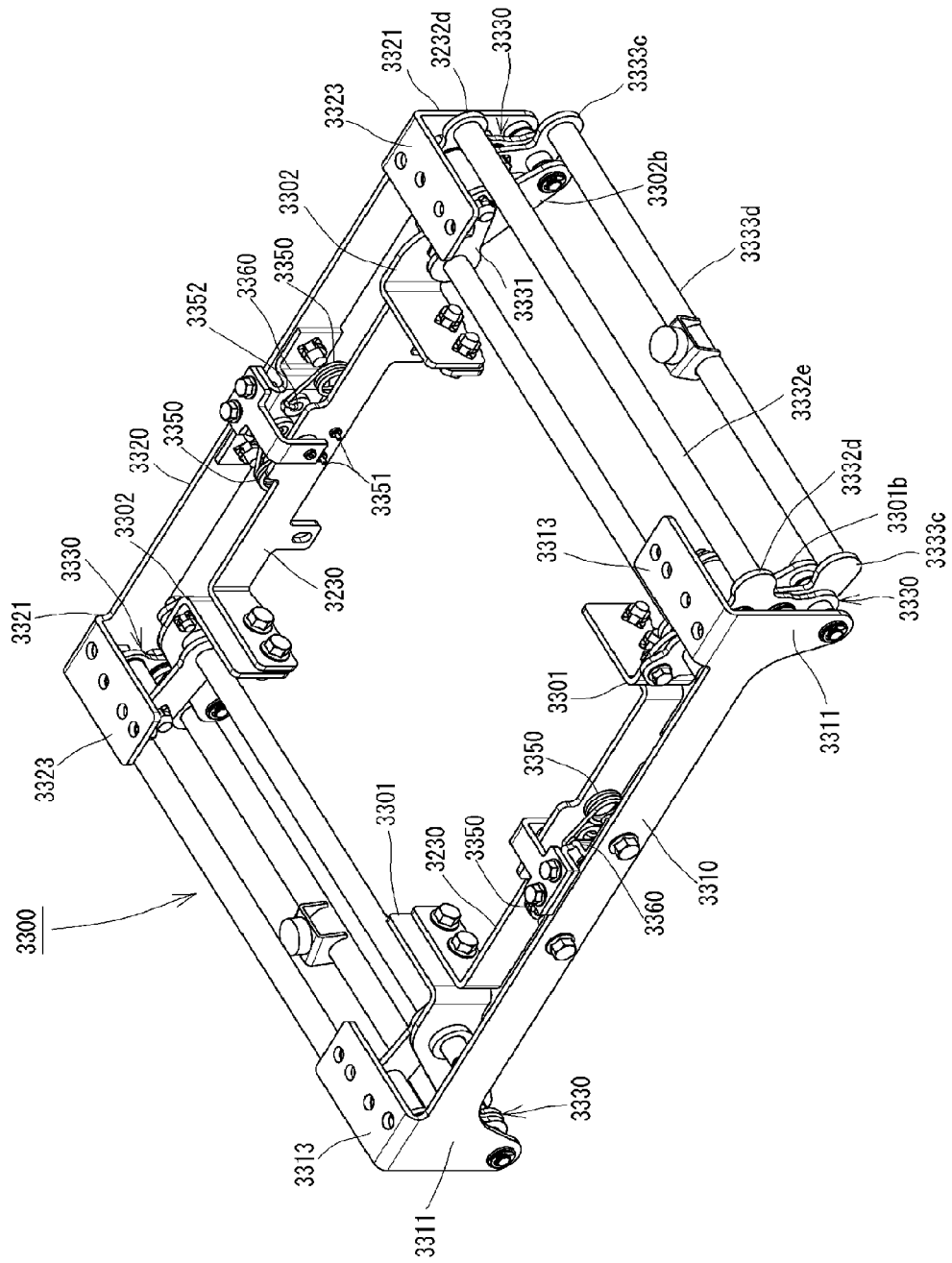
FIG. 25 is a perspective view showing a left-right suspension used in the suspension mechanism.
Figure 26:
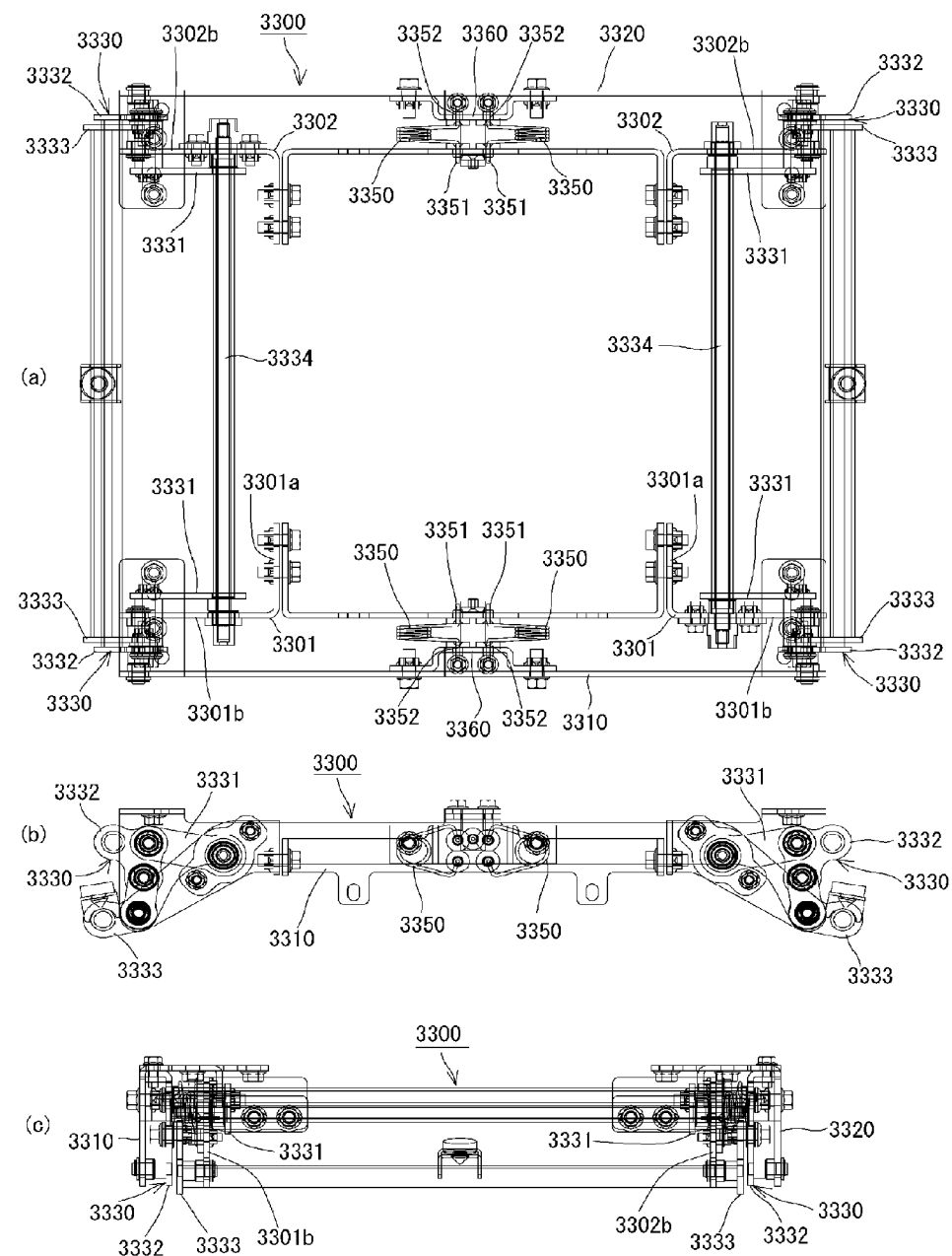
FIG. 26(a) is a plan view of the left-right suspension shown in FIG. 25.
FIG. 26(b) is a front view of FIG. 26(a)
FIG. 26(c) is a side view of FIG. 26(a).

The left-right suspension 3300 is similar to that disclosed in the above Patent Literature 4 (Japanese Unexamined Patent Application Publication No. 2014-213752). Specifically, as shown in FIGS. 25 and 26, the left-right suspension 3300 includes four brackets 3301, 3302 disposed at predetermined distances in the front-rear and left-right directions; the movable rails 3220, 3220 of the front-rear suspension 3200 are sandwiched between the brackets 3301, 3302 and the left and right ends of the movable connection frames 3230, 3230 of the front-rear suspension 3200 and connected and fixed thereto by bolts (see FIG. 19); a front frame 3310 is disposed in such a manner that tabular parts 3311, 3311 located on the left and right ends thereof face the two (left and right) front-side brackets (front brackets) 3301, 3301; and a rear frame 3320 is disposed in such a manner that tabular parts 3321, 3321 located on the left and right ends thereof face the two (left and right) rear-side brackets (rear brackets) 3302, 3302.

Connections are made between front brackets 3301, 3301 and the tabular parts 3311, 3311 of the front frame 3310 corresponding thereto and between rear brackets 3302, 3302 and the tabular parts 3321, 3321 of the rear frame corresponding thereto through a total of four link mechanisms 3330.

Figure 27:
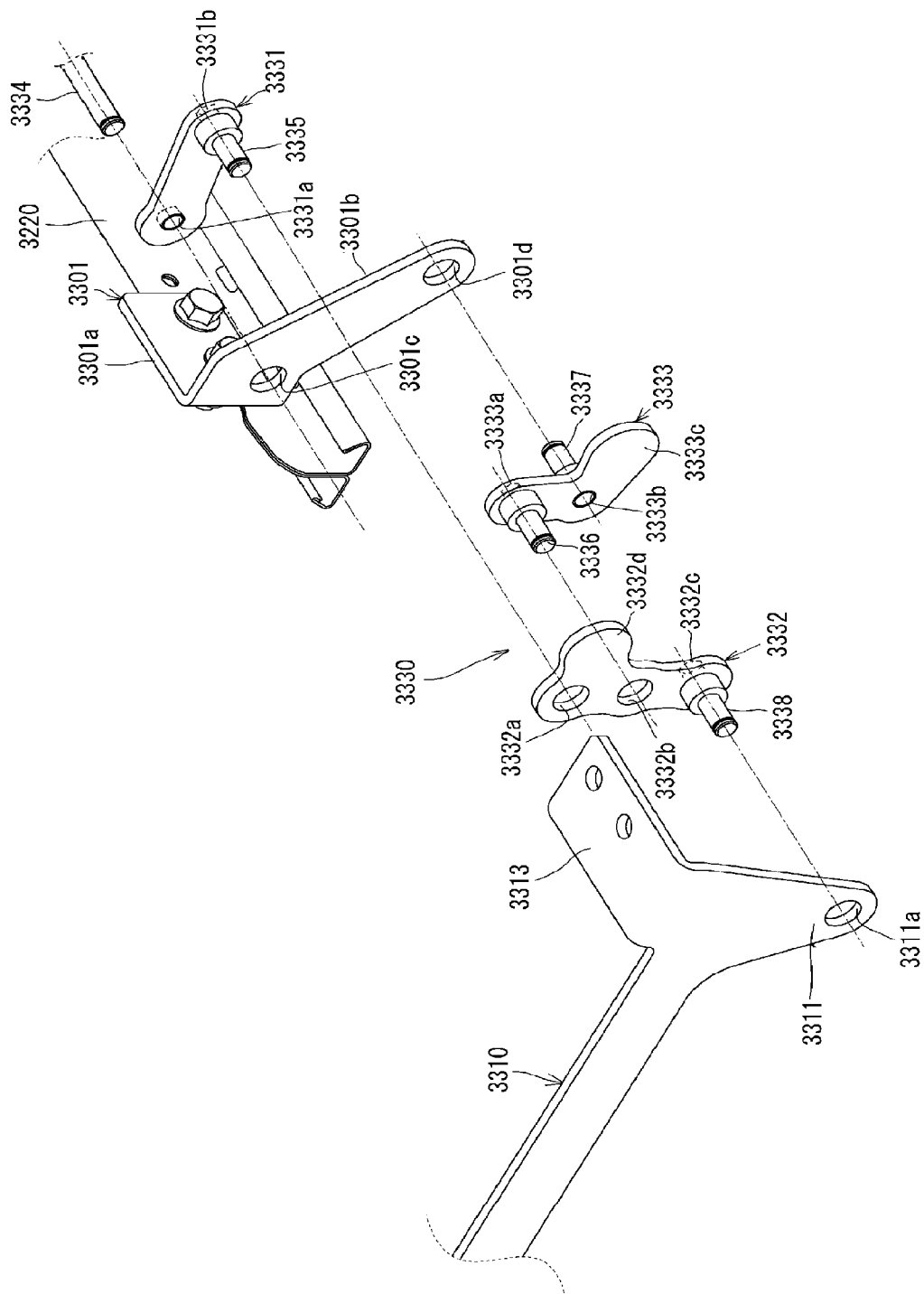
FIG. 27 is an exploded perspective view of major parts of the left-right suspension.
Figure 28:
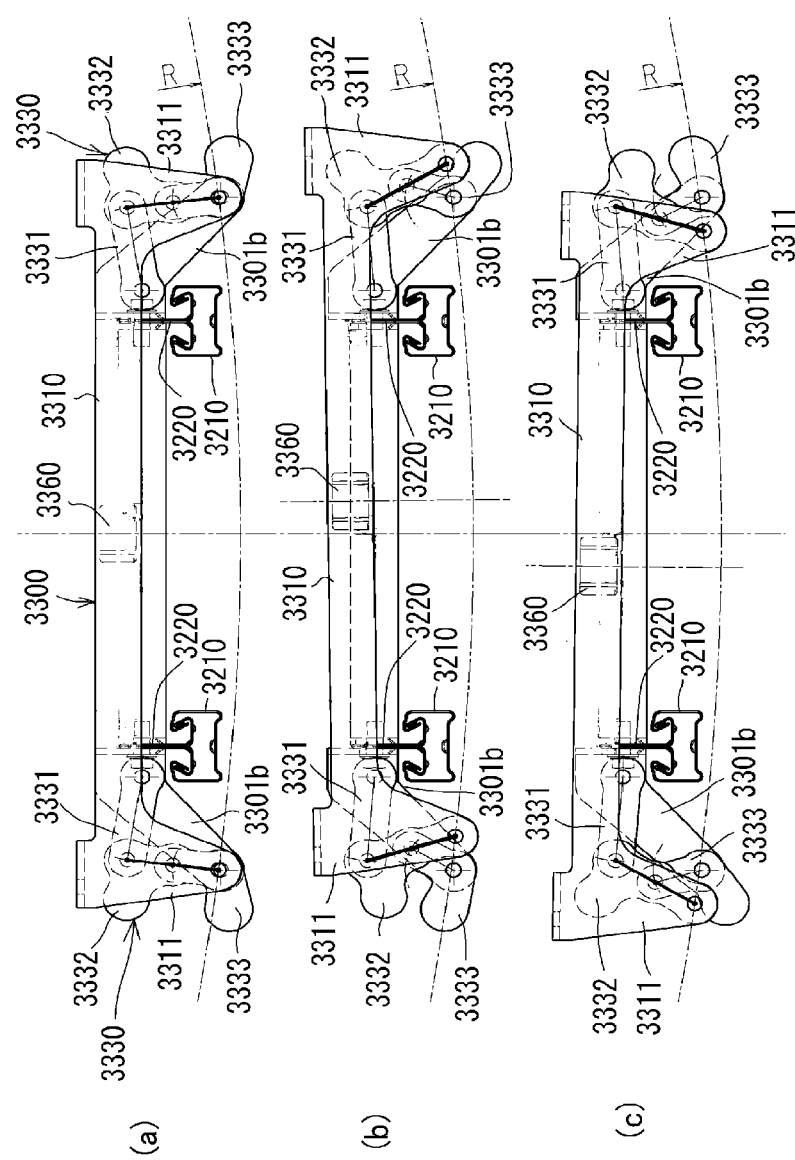
FIGS. 28(a) to 28(c) are drawings showing the movement of the left-right suspension.

Next, the link mechanisms 3330 will be described. While the front bracket 3301 and front frame 3310 are mainly used in the following description, the same also applies to the rear bracket 3302 and rear frame 3320. That is, as shown in FIGS. 26 and 27, each link mechanism 3330 includes a first link 3331, a second link 3332, and a third link 3333. Each front bracket 3301 has an approximately L shape in a plan view and includes a base 3301a fixed to a movable rail 3220 of the front-rear suspension 3200 and a link support 3301b protruding from the base 3301 downward obliquely. The link support 3301b has an upper connection hole 3301c in a portion thereof close to the base 3301a and a lower connection hole 3301d near the lower end thereof which is located in a lower oblique position. On the other hand, the tabular part 3311 of one end of the front frame 3310 has a lower connection hole 3311a near the lower end thereof.

The first link 3331 is disposed so as to extend approximately transversely and has an inner penetration hole 3331a and an outer penetration hole 3331b near the ends thereof. The second link 3332 is disposed so as to extend approximately vertically and has an upper penetration hole 3332a, a center penetration hole 3332b, and a lower penetration hole 3332c in three areas: an area near the upper end, an area near the center, and an area near the lower end. The third link 3333 has an approximately L shape and has an upper penetration hole 3333a near the upper end of an approximately vertical edge thereof and a lower penetration hole 3333b near the lower end of the approximately vertical edge. The first link 3331 is disposed so as to be close to an inner upper portion of the link support 3301b of the front bracket 3301 and to extend approximately transversely. The third link 3333 is disposed close to an outer lower portion of the link support 3301b. The second link 3332 is disposed between the third link 3333 thus disposed and the tabular part 3311 located on the end of the front frame 3310.

The upper connection hole 3301c of the front bracket 3301 and the inner penetration hole 3331a of the first link 3331 are connected by a shaft member 3334. The shaft member 3334 extends between the front bracket 3301 and rear bracket 3302. The shaft member 3334 is also connected to the inner penetration hole 3331a of the first link disposed close to the rear bracket 3302. Thus, the front bracket and rear bracket are synchronized. The outer penetration hole 3331b of the first link 3331 and the upper penetration hole 3332a of the second link 3332 are connected by a connection pin 3335.

The center penetration hole 3332b of the second link 3332 and the upper penetration hole 3333a of the third link 3333 are connected by a connection pin 3336. The lower penetration hole 3333 of the third link 3333 and the lower connection hole 3301d of the front bracket 3301 are connected by a connection pin 3337. The lower penetration hole 3332c of the second link 3332 and the tabular part 3311 of the front frame 3310 are connected by a connection pin 3338.

The second link 3332 has a shape including a protrusion 3332d that is adjacent to the upper penetration hole 3332a and protrudes outward. The protrusion 3332d protrudes so as to be located outside the link supports 3301b, 3302b of the brackets 3301, 3302. A reinforcing pipe 3332e extends between the protrusions 3332d, 3332d of the front-side and rear-side second links 3332, 3332. Thus, the strength is increased, and the front-side and rear-side second links 3332, 3332 are synchronized. Similarly, the third link 3333 includes a protrusion 3333c protruding outward. A reinforcing pipe 3333d extends between the protrusions 3333c, 3333c of the front-side and rear-side third links 3333, 3333. Thus, the strength is increased, and the third links 3333, 3333 are synchronized.

The movable connection frame 3230 close to the front portion of the front-rear suspension 3200 and the front frame 3310 of the left-right suspension 3300 are elastically connected by a spring member 3350. Similarly, the movable connection frame 3230 close to the rear portion of the front-rear suspension 3200 and the rear frame 3320 of the left-right suspension 3300 are elastically connected by a spring member 3350. In the present embodiment, the spring members 3350 are torsion coil springs; one ends 3351 thereof are fitted to the movable connection frames 3230, 3230 of the front-rear suspension 3200; the other ends 3352 are fitted to spring fixing brackets 3360 disposed on the front frame 3310 and rear frame 3320 of the left-right suspension 3300; and when the left-right suspension 3300 moves relative to the front-rear suspension 3200 in the left-right direction, the torsion coil springs serving as the spring members 3350 expand and contract and thus elasticity works so as to buffer the force in the left-right direction. Note that the spring members 3350 need not be torsion coil springs and may be, for example, coil springs that extend between the front-rear suspension 3200 and left-right suspension 3300 and whose elasticity works in the axial direction.

As shown in FIGS. 18 and 19, a lower portion of the seat support mechanism 1 used in the seat structure 1000 shown in FIG. 14 is fixed to mounting parts 3313, 3323 located near the ends of the front frame 3310 and rear frame 3320 of the left-right suspension 3300.

When the left-right suspension 3300 rolls (makes low-frequency vibration) due, for example, to the phase shift of the hydraulic suspension of the vehicle, for example, the vehicle floor in the neutral position shown in FIG. 28(a) oscillates relatively to the left in a front view as shown in FIG. 28(b). Thus, the front frame 3310 and rear frame 3320, and the seat structure 1000 supported thereby oscillate relatively to the right.

In each link mechanism 3330, for example, the lower connection hole 3311a of the front frame 3310 is connected to the lower penetration hole 332c of the second link 3332 by the connection pin 3338. For this reason, as shown in FIGS. 28(a) to 28(c), when the front frame 3310 is displaced in the left-right direction, the connection point (the position of the connection pin 3338) is displaced in the left-right direction accordingly. Since the upper penetration hole 3332a of the second link 3332 is connected to the outer penetration hole 3331b of the first link 3331 through the connection pin 3335, the connection point of the lower connection hole 3311a and lower penetration hole 3332c (the position of the connection pin 3338) is displaced in the left-right direction (in the width direction of the vehicle) along an arc trajectory using the connection pin 3335 as an oscillation fulcrum.

The upper penetration hole 3333a of the third link 3333 is connected to the center penetration hole 3332b of the second link 3332 through the connection pin 3336. For this reason, when the lower penetration hole 3332c side of the second link 3332 attempts to make an arc movement in the left-right direction, the upper penetration hole 3333a side of the third link 3333 makes an arc movement in the left-right direction around the connection pin 3337, since the lower penetration hole 3333b of the third link 3333 is connected to the lower connection hole 3301d of the front bracket 3301 through the connection pin 3337. Thus, the front frame 3310 connected to the lower penetration hole 3332c of the second link 3332 through the lower penetration hole 3332c and connection pin 3338 makes an arc movement in the left-right direction along a stable trajectory using the position of the upper penetration hole 3332a as an oscillation fulcrum. Such an arc movement absorbs the roll. The same applies to the trajectory of the rear frame 3320.

Figure 29:
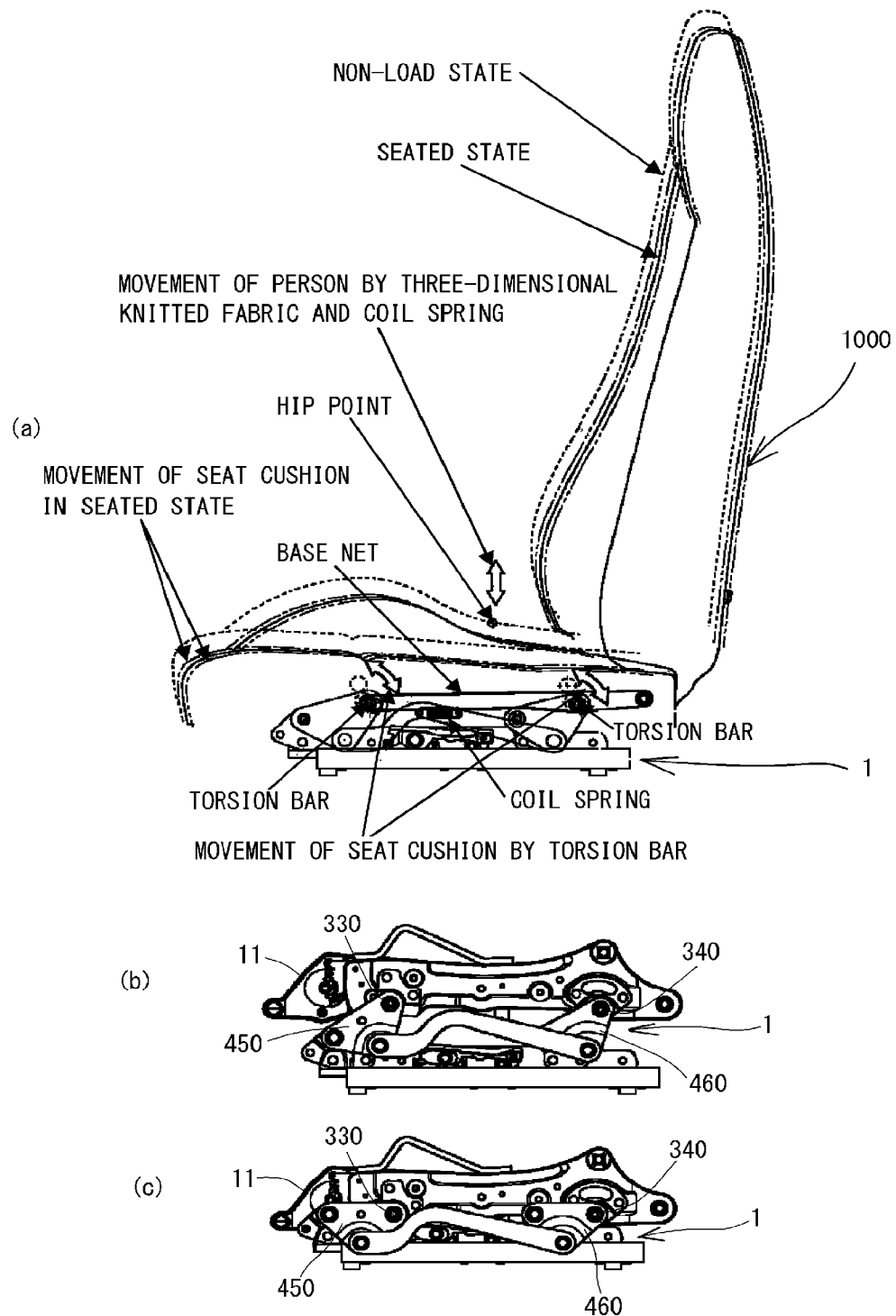
FIG. 29(a) is a drawing showing the movement of the seat structure of the suspension seat of the above embodiment.
FIG. 29(b) is a drawing showing the upper end position of the seat support mechanism shown in FIG. 29(a)
FIG. 29(c) is a drawing showing the lower end position of the seat support mechanism shown in FIG. 29(a).

As described above, the suspension seat 2000 of the present embodiment has a structure where the seat structure 1000 shown in FIG. 14 is fixed to the upper portion of the suspension mechanism 3000. The seat structure 1000 shown in FIG. 14 includes the base net 110 whose ends are connected by the coil spring 113 and the cushion member 120 (a multilayer structure consisting of a three-dimensional knitted fabric and a urethane material in an experiment to be discussed later) and thus forms a person-supporting layer (an upper layer). A lower layer consists of the seat support mechanism 1 including the torsion bars 330, 340 and link mechanism 40 of the present embodiment and supports a person and seat structure 1000. The states of the upper end position and lower end position of the seat support mechanism 1 used in FIG. 14 are as shown in FIG. 29, and the seat support mechanism 1 is a three-degrees-of-freedom structure. The suspension mechanism 3000 supporting the seat support mechanism 1 is a four-degrees-of-freedom structure, and the suspension seat 2000 of the present embodiment shown in FIG. 18 obtained by combining these components is a six-degrees-of-freedom structure.

Experimental Example

A vibration experiment was performed on the suspension seat 2000 shown in FIG. 18. The characteristics of the suspension seat 2000 used in the experiment were as follows. The characteristics of the cushion member 120 of the seat structure 1000 included in the suspension seat 2000 were slightly rigid characteristics as the characteristics of a cushion member used in a vehicle seat; the spring constant was 26542 N/m (calculated from data about "TB fixed-without coil spring" in FIG. 17); the spring constant of each of the torsion bars 330, 340 of the seat support mechanism 1 was 58500 N/m; and the combined spring constant of both was 19425 N/m (calculated from data about "TB normal-with coil spring" in FIG. 17).

Figure 30:
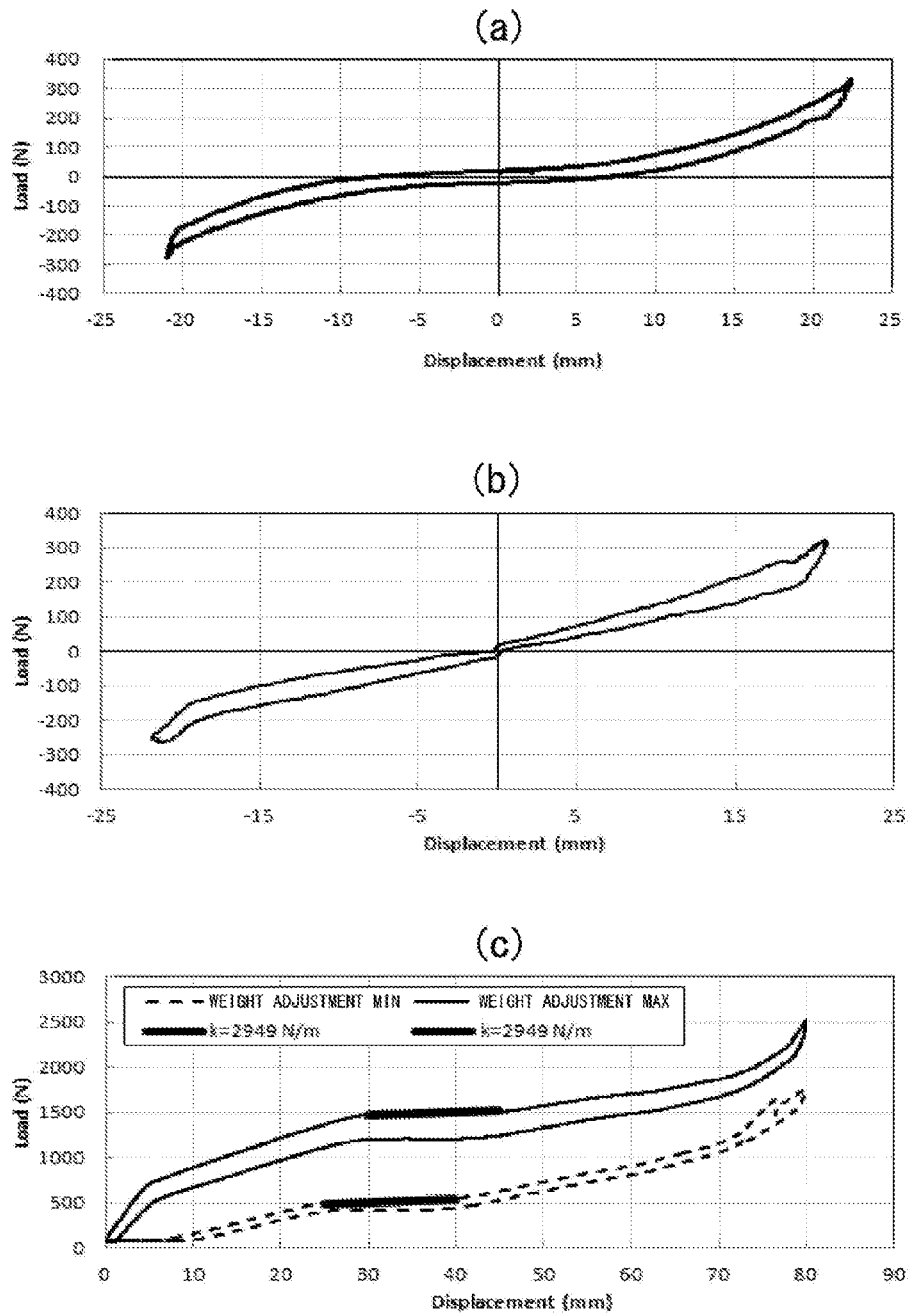

The respective load-deflection characteristics of the left-right suspension 3300, front-rear suspension 3200, and vertical suspension 3100 forming the suspension mechanism 3000 are as shown in FIG. 30. The left-right suspension 3300 and vertical suspension 3100 have structures showing non-linear duffing characteristics having a region whose spring constant is extremely low and close to substantially zero [see FIGS. 30(a) and 30(c)]. The basic characteristics of the front-rear suspension 3200 are linear, although apparent nonlinear components due to the slide resistance are identified at the equilibrium point [see FIG. 30(b)].

Figure 31:
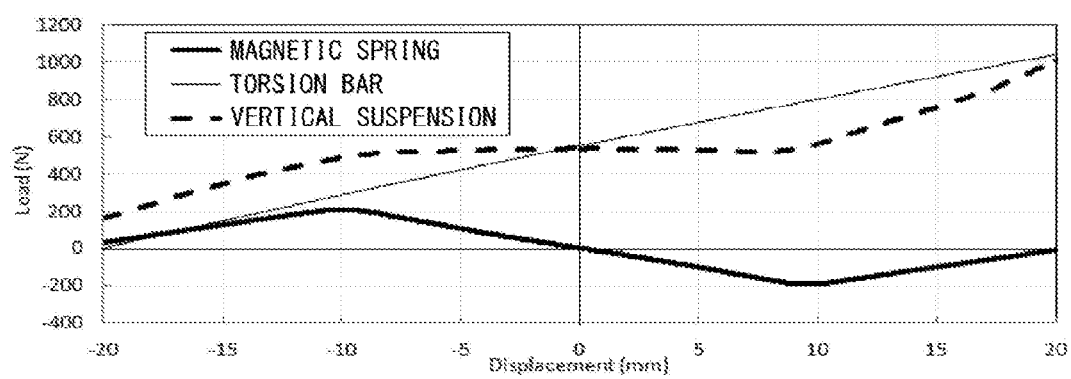
FIG. 31 is a graph showing load-deflection characteristics of the vertical suspension, a magnetic spring, and a torsion bar.

More specifically, as shown in FIG. 31, characteristics of the vertical suspension 3100 are a combination of characteristics of the torsion bars 3150, 3150 having positive spring constants and characteristics of the magnetic spring 3160 having a negative spring constant. Thus, the vertical suspension 3100 as a whole forms a structure indicating nonlinear duffing characteristics. Also, as is apparent in FIGS. 30(c) and 31, not a Coulomb friction but a rolling friction works on vibration transmitted from the vehicle floor, since the magnetic spring 3160 is provided. For this reason, the vertical suspension 3100 is a structure free of a hysteresis loss.

Figure 32:
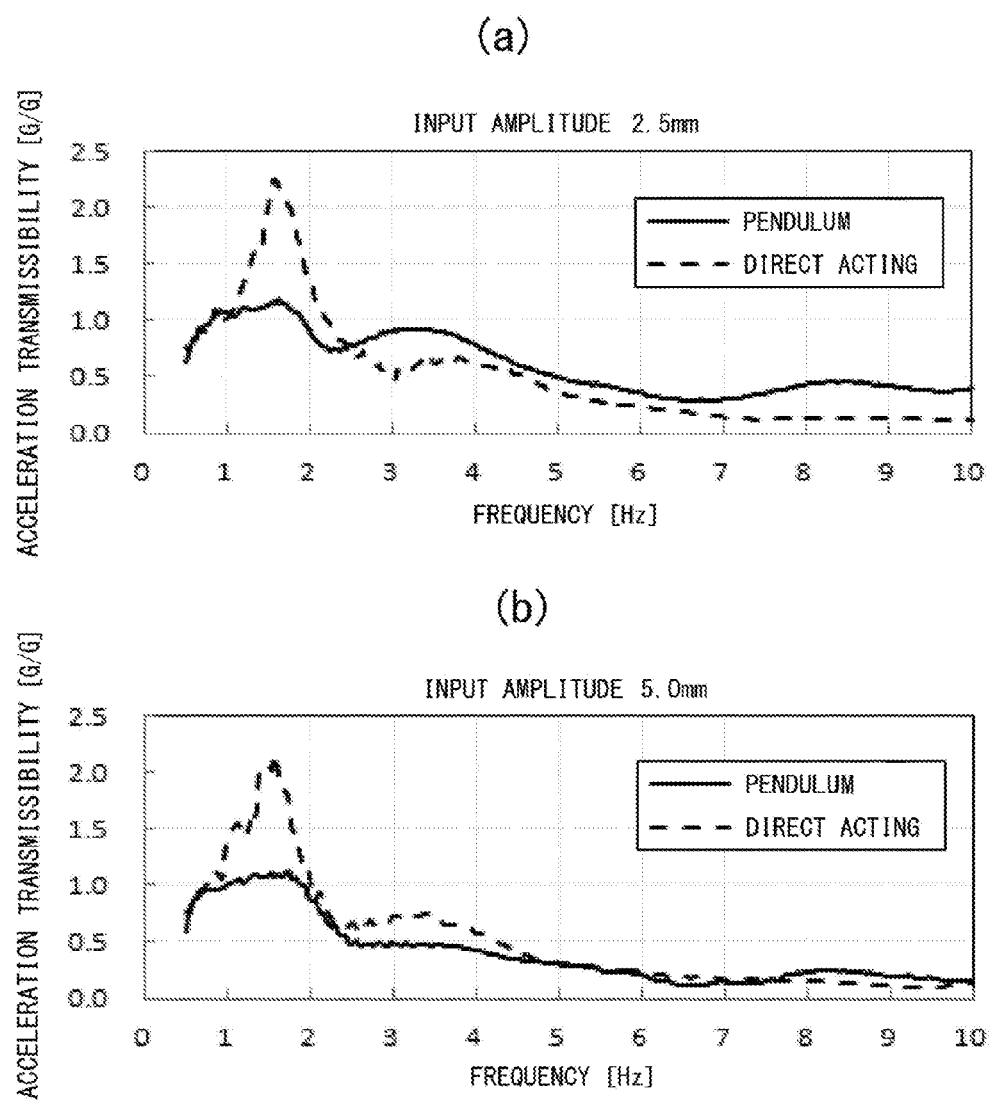
FIG. 32(a) is a graph showing vibration transmission characteristics of the left-right suspension when the input amplitude is 2.5 mm.
FIG. 32(b) is a graph showing vibration transmission characteristics of the left-right suspension when the input amplitude is 5.0 mm.
Figure 33:
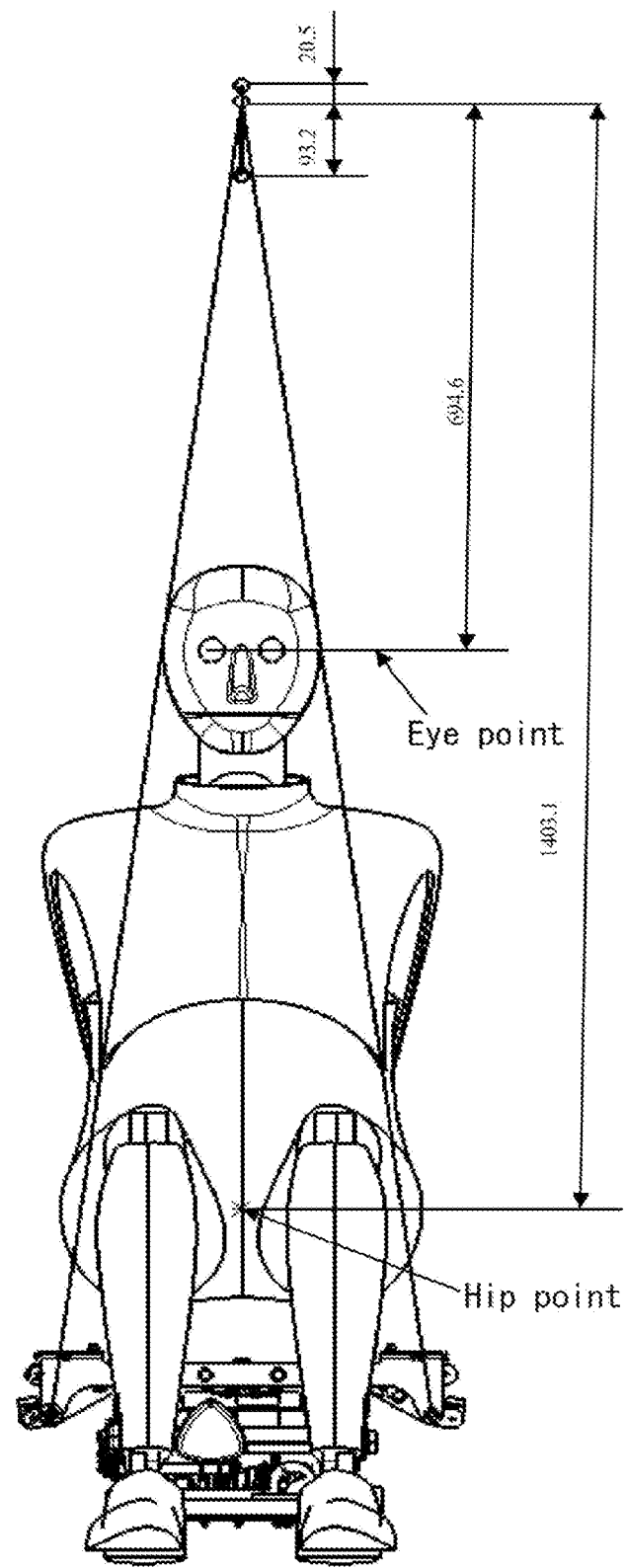
FIG. 33 is a drawing showing the centrode of the left-right suspension.

As described above, the left-right suspension 3300 absorbs roll by making an arc movement (a pendulum movement) rather than directly acting transversely. On the other hand, FIG. 32 shows a comparison between the vibration transmission characteristics of the left-right suspension 3300 of the present embodiment making an arc movement (a pendulum movement) and those of a left-right suspension of a type that simply directly acts transversely. The comparison reveals that while the resonance peak of the direct act-type left-right suspension is raised in a low frequency range, that of the left-right suspension 3300 of the present embodiment making an arc movement (a pendulum movement) is kept low. That is, the left-right suspension 3300 of the present embodiment is a structure that is less likely to cause resonance. FIG. 33 is a diagram showing the centrode of the left-right suspension 3300 of the present embodiment and indicates that the rotation center of a pendulum is present above the head of a subject.

Experiment Method

The subjects were a total of three persons consisting of one healthy twentysomething male having a weight of 60 kg and two healthy fortysomething males having weights of 72 kg and 84 kg. The six-degrees-of-freedom suspension seat 2000 of the present embodiment (the vertical stroke of the suspension mechanism 3000: 80 mm) was set on a vibrator, and a vibration experiment was performed by exciting the suspension seat having each subject seated thereon. For comparison, a seat using a one-degree-of-freedom suspension mechanism (vertical stroke: 160 mm) made in Germany was also measured. The excitation waveform consisted of a sinusoidal sweep waveform and a triaxial irregular vibration waveform obtained by simulating the track of a streetcar collected on an ordinary road in the Hiroshima City. The vehicle used to collect the simulation vibration waveform was an ordinary van, and the traveling speed was 40 km/h.

Figure 34:
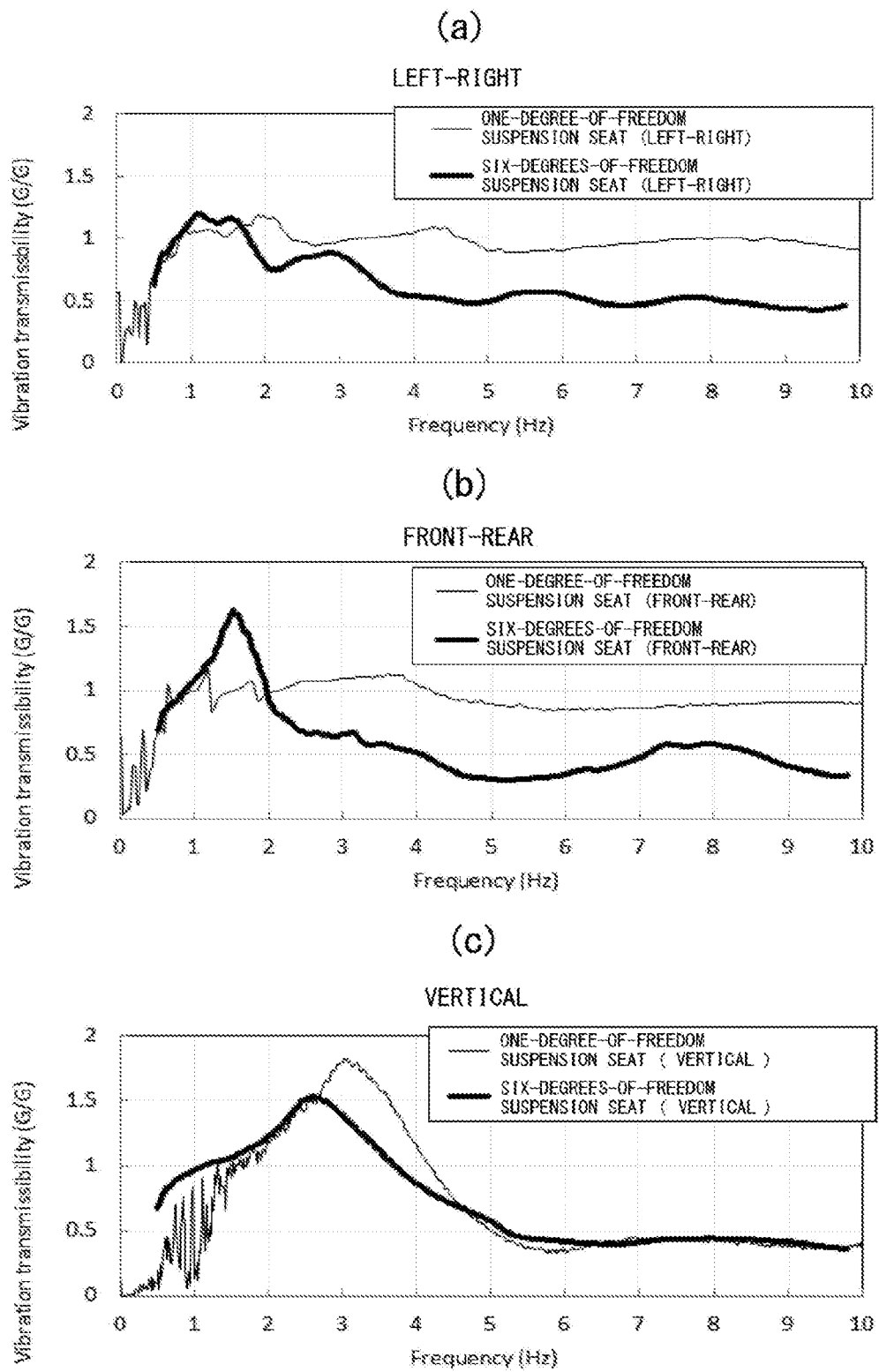
Figure 35:
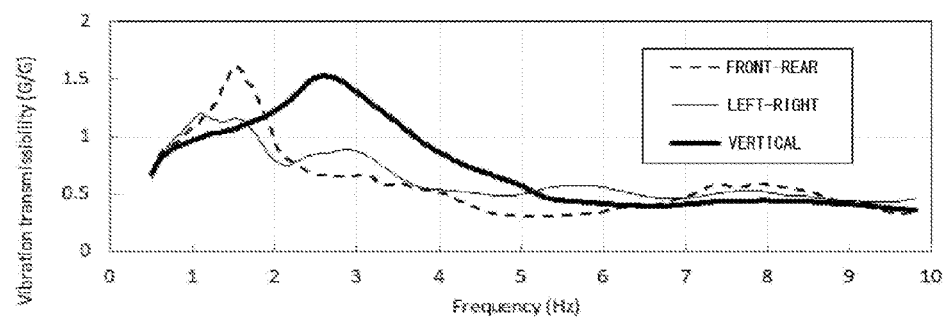
FIG. 35 is a graph collectively showing vibration transmission characteristics of a six-degrees-of-freedom suspension seat in FIGS. 34(a) to 34(c).

FIG. 34 includes graphs showing vibration removal performance when sinusoidal vibration is inputted in the left-right, front-rear, and vertical directions with the subject having a weight of 84 kg seated. That is, FIG. 34 shows the measurement results of the suspension seat 2000 of the present embodiment ("six-degrees-of-freedom suspension seat" in FIG. 34) and the measurement results of the suspension seat using the one-degree-of-freedom suspension mechanism of Comparative Example made in Germany ("one-degree-of-freedom suspension seat" in FIG. 34). FIG. 35 is a graph collectively showing the vibration removal performance in the left-right, front-rear, and vertical directions of the suspension seat 2000 of the present embodiment. These results reveal that the resonance peaks in the three directions of the suspension seat 2000 of the present embodiment were all present in a range of 4 Hz or less and that the suspensions in the three directions all functioned when external vibration of 4 Hz or more was inputted.

Figure 36:
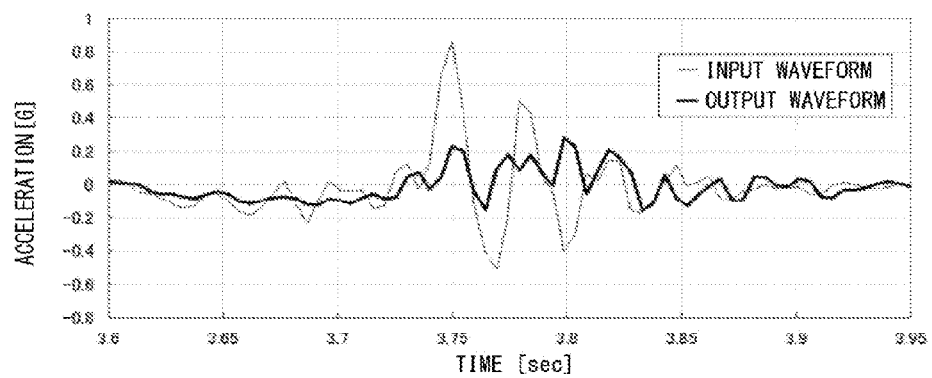
FIG. 36 is a graph showing characteristics when the six-degrees-of-freedom suspension seat receives impactive vibration.

FIG. 36 is a graph showing the absorption performance when impactive vibration is inputted and indicates that the suspension seat 2000 of the present embodiment reduced the maximum acceleration to half or less.

Figure 37:
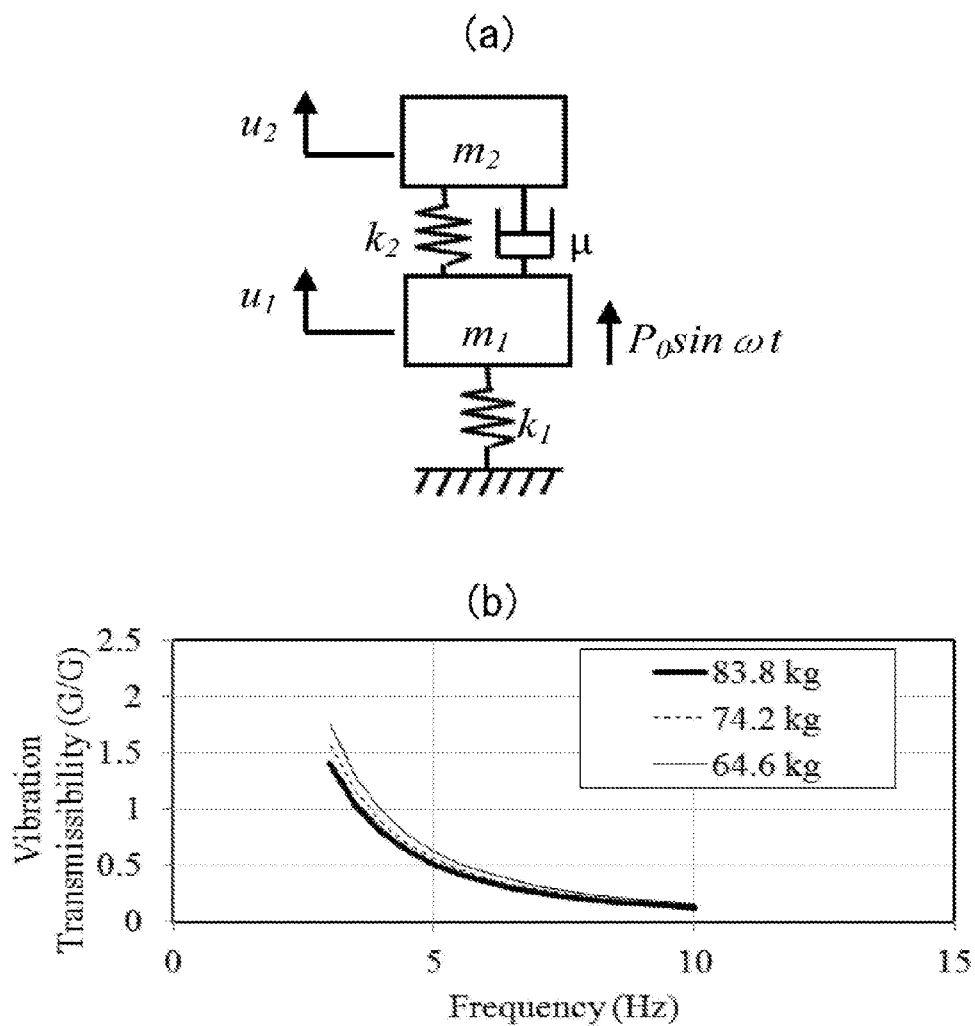
FIG. 37(a) is a drawing showing a two-degrees-of-freedom system vibration model used in analysis.
FIG. 37(b) is a graph showing the analysis results.

FIG. 37 includes a diagram showing a two-degrees-of-freedom vibration model and a graph showing results obtained by performing analysis using the parameters of FIGS. 17 and 30 and Formula 1 below.

[Formula 1]

$$\frac{u_{20}}{u_s} = \frac{\sqrt{v_2^4 + 4\zeta^2 v^2/M}}{\sqrt{\{v^4 - (1 + v_2^2 + Mv_2^2)v^2 + v^2\}^2 + 4\zeta^2 v^2 \{1 - (1 + M)v^2\}^2/M}} \quad (1)$$

where $M = m_2/m_1$, $u_s = P_0/k_1$, $\Omega_1^2 = k_1/m_1$, $$\Omega_2^2 = k_2/m_2 v_2^2 = \Omega_2^2/\Omega_1^2, v_2 = \omega_2/\Omega_1^2$$

In Formula 1, m1 represents the sum of the sprung mass of the suspension mechanism 3000 (the total mass of the upper frame body 3130 of the vertical suspension 3100 and the front-rear suspension 3200 and left-right suspension 3300 supported by the upper frame body 3130; 14.2 kg in this example) and the unsprung mass of the seat support mechanism 1 (the total mass of the members under the cushion frame 10 supported by the seat support mechanism 1; 3.0 kg in this example) and is 17.2 kg. m2 represents the sum of the sprung mass of the seat structure 1000 (the total mass of the members over the seat support mechanism 1, including the cushion frame 10 supported by the seat support mechanism 1; 16.6 kg in this example), and the weight of the person (60 kg, 72 kg, 84 kg). Since the weight inputted to the back rest and the weight of legs are excluded from the weight of the person, the load share is regarded as 80%. As a result, m2 is 64.6 kg, 74.6 kg, 83.8 kg. u20 represents the amplitude of m2, and the inputted vibration is regarded as external force P0 sin Ωt applied to mass m1. P0 sin ωt represents the acceleration and inertia force of the vehicle and the acceleration inputted from the floor. k1 represents the spring constant of the suspension mechanism 3000 and is 2949 N/m. k2 represents the spring constant of the seat structure 1000 and is 19425 N/m. μrepresents the damping coefficient. ζ represents the damping ratio and is 0.2. This value is used in an ordinary seat and obtained in an experiment.

Formula 1 represents the transmissibility obtained from the amplitude ratio by generating an equation of state with respect to vertical vibration input of the six-degrees-of-freedom suspension seat 2000. Since analysis is performed using acceleration inputted to the unsprung mass of the suspension mechanism 3000, a forced vibration model is used rather than using a displacement excitation model.

Figure 38:
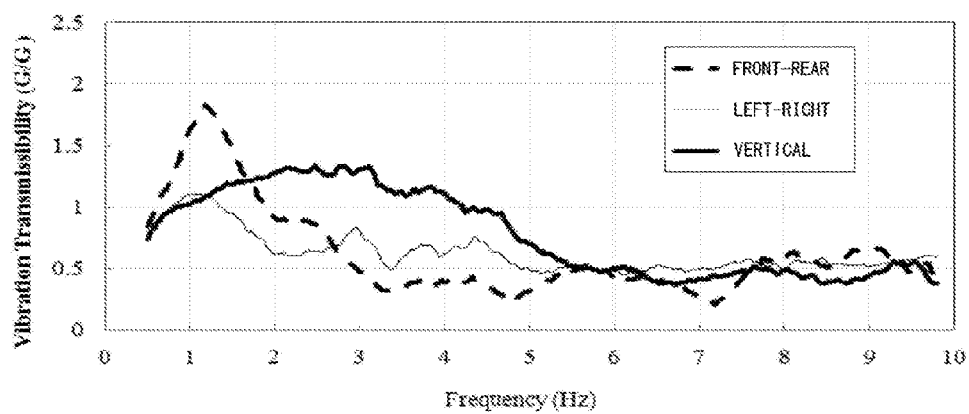
FIG. 38 is a graph showing the results obtained by evaluating vibration characteristics using left-right, front-rear, and vertical reproduced waveforms collected from the track of the Ujina streetcar in the Hiroshima City with respect to a subject having a weight of 84 kg.
Figure 39:
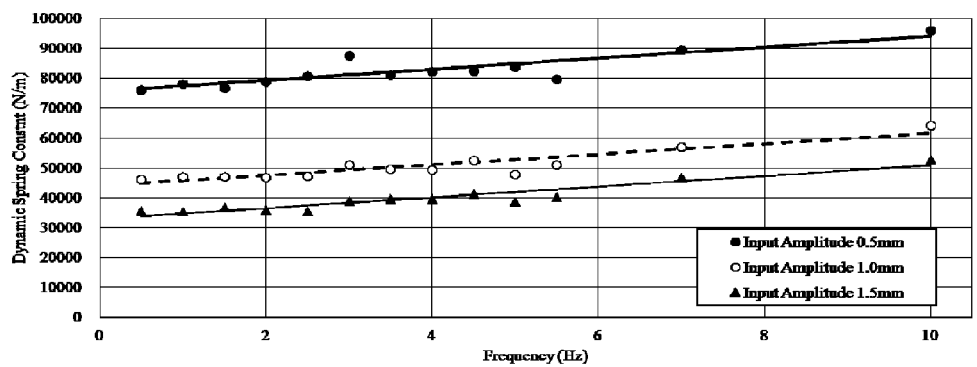
FIG. 39 is a graph showing results obtained by measuring the dynamic spring constant of torsion bars included in the suspension mechanism.

FIG. 38 shows results obtained by reproducing the acceleration in the left-right, front-rear, and vertical directions collected from the Ujina streetcar track, which is the track of a streetcar in the Hiroshima City, using a six-degrees-of-freedom vibrator and evaluating vibration characteristics using an obtained waveform. The results are understood to be similar to the evaluation results using a sinusoidal wave shown in FIG. 35. The damping tendency of a transfer function obtained in this measurement matched that of the analysis results of a two-degrees-of-freedom system having a dynamic damper using Formula (1) above. This indicates that the vibration characteristics of the six-degrees-of-freedom suspension seat 2000 of the present embodiment depend on the spring characteristics and structural damping of the suspension mechanism 3000 rather than depending on the vibration characteristics of the seat structure 1000. For this reason, the dynamic spring constants of the torsion bars included in the suspension mechanism 3000 were checked, and results shown in FIG. 39 were obtained. These results indicate that the dynamic spring constants of the torsion bars were increased while depending on the amplitude of the input vibration and that this tendency was attributable to the influence of the structural damping of the suspension seat 2000.

Figure 40:
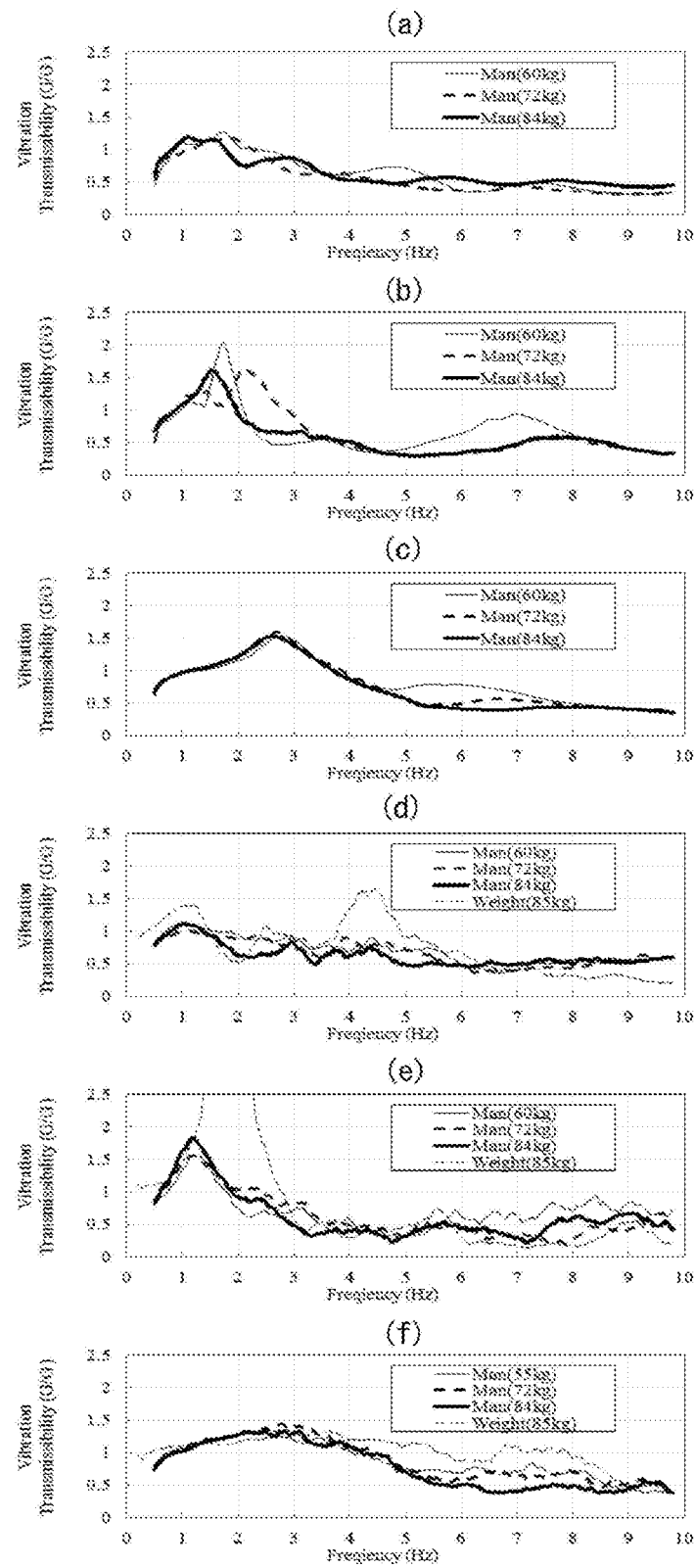

FIG. 40 includes graphs showing the experiment results of three subjects including additional two subjects and reveals that the experiment results of all the subjects were similar to those described above.

However, more detailed examination of FIG. 40(*b*) reveals that while the subject having a weight of 72 kg generated two peaks in a range of 1 to 3 Hz, the other subjects did not show such a tendency. The reason is that while the other subjects were seated deeply so that the backs thereof are sufficiently in contact with the back rest, the subject having a weight of 72 kg was seated in such a manner that the back thereof is spaced from the back rest and measured. As shown in FIG. 29, the suspension seat 2000 of the present embodiment makes not only a vertical movement but also a front-rear movement together with the seat back and seat cushion in a seated state. This is because the suspension seat 2000 of the present embodiment is able to make movements in the triaxial directions, including the movements of the torsion bars 330, 340 of the seat support mechanism 1. However, if the back is not in contact with the seat back, the vibration removal function through the seat back is difficult to sufficiently obtain. That is why the two peaks appeared in the data about the subject having a weight of 72 kg.

The same applies to FIGS. 40(*d*) to 40(*f*). In these examples, the vibration transmission characteristics when a weight of 85 kg was placed with the center thereof aligned with the design hip point of the seat cushion were also measured. Since the weight was not in contact with the seat back, it was not influenced by the movement of the seat back at all, but rather generated multiple peaks in the data about left-right vibration and showed higher vibration transmissibility than the data about the subjects. Also, the weight generated a resonance peak having an extremely high vibration transmissibility around 2 Hz in the data about front-rear vibration. Further, with regard to front-rear vibration and vertical vibration, the weight showed a higher vibration transmissibility than the data about the subjects in a range of 4 Hz or more.

Figure 41:
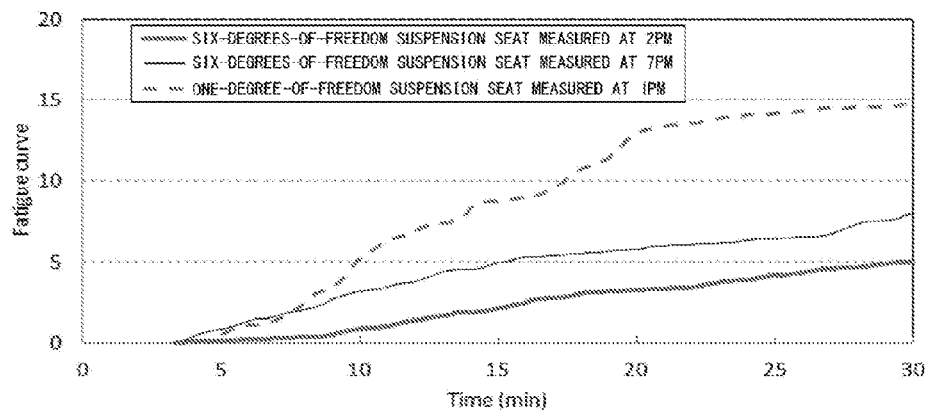
FIG. 41 is a graph showing the degree of fatigue for 30 min when a subject is seated in a static state.
Figure 42:
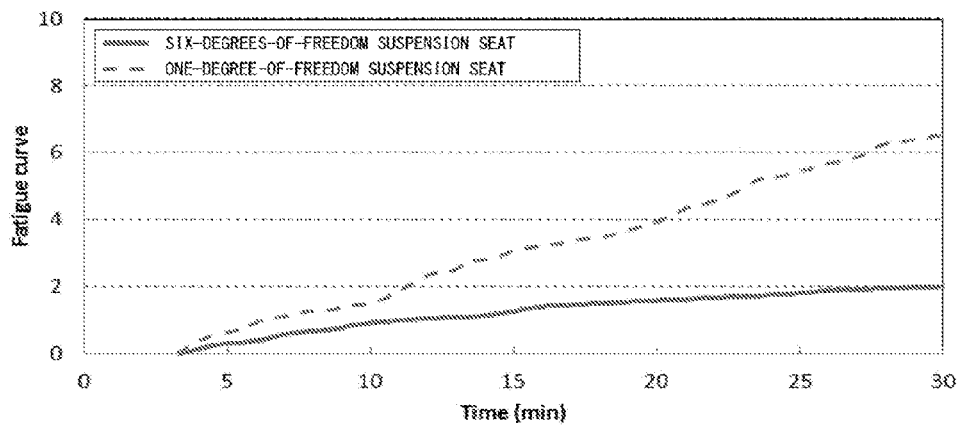
FIG. 42 is a graph showing the degree of fatigue for 30 min when a subject is seated in a dynamic state using a reproduced waveform of the track of the Ujina streetcar.

FIG. 41 shows the degree of fatigue attributable to seating calculated using a digital volume pulse wave in a static seating experiment for 30 minutes. FIG. 41 indicates that the six-degrees-of-freedom suspension seat 2000 favorably absorbed a body movement made on the seat and prevented bloodflow inhibition in the peripheral circulation system compared to a one-degree-of-freedom suspension seat. FIG. 41 also shows values re-calculated at a different time with respect to the suspension seat 2000 and indicates that the progress of the degree of fatigue is less likely to depend on the measurement time. FIG. 42 shows a 30-min dynamic seating experiment using a reproduced waveform of the Ujina streetcar track. As with FIG. 41, FIG. 42 reveals that the six-degrees-of-freedom suspension seat 2000 did not increase the progress of the degree of fatigue compared to the one-degree-of-freedom suspension seat.

REFERENCE SIGNS LIST

1 seat support mechanism
10 cushion frame
11 side frame
12 front frame
13 rear frame
110 base net
113 coil spring
20 slider
30 lifter
310 clutch mechanism
312*a* output gear
320 rotational force transmission mechanism
323 sector gear (front rotor)
325 rear drive link
327 rear drive link (rear rotor)
330 front torsion bar
340 rear torsion bar
350 screw
351 nut member
40 link mechanism
410 front link mechanism
411 front fixed link
412 frame-side front link
413 first front movable link
414 second front movable link
420 rear link mechanism
421 rear fixed link
422 rear movable link
430 connection movable link
1000 seat structure
2000 suspension seat
3000 suspension mechanism
3100 vertical suspension
3200 front-rear suspension
3300 left-right suspension

The invention claimed is:

1. A seat support mechanism comprising:
a lifter configured to adjust a height of a seat cushion;
a link mechanism disposed between a base supporting a cushion frame of the seat cushion and the cushion frame and configured to be displaced when the height is adjusted, wherein
the lifter includes:
a clutch mechanism configured to provide a rotational force;
a rotational force transmission mechanism including a rotor that rotates by a rotational force transmitted from the clutch mechanism; and
a torsion bar that has one end connected to a rotation center of the rotor of the rotational force transmission mechanism of the lifter and the other end connected to the link mechanism and extends in a width direction of the cushion frame, and the torsion bar has both a function of, when the lifter adjusts the height, adjusting a height of the cushion frame by elasticity thereof using the other end connected to the link mechanism as a fixed end and a function of, when external vibration is inputted, absorbing the vibration by elasticity thereof using the one end connected to the rotor of the rotational force transmission mechanism as a fixed end based on movement of the link mechanism based on displacement of the cushion frame relative to the base,
wherein the link mechanism includes:
a pair of front link mechanisms located on a front portion of the cushion frame and disposed so as to be spaced from each other in the width direction; and
a pair of rear link mechanisms located on a rear portion of the cushion frame and disposed so as to be spaced from each other in the width direction, the torsion bar includes:
a front torsion bar corresponding to the front link mechanisms; and a rear torsion bar corresponding to the rear link mechanisms, the front torsion bar has one end connected to the rotor of the rotational force transmission mechanism and the other end connected to front movable links of the front link mechanisms, and the rear torsion bar has one end connected to the rotor of the rotational force transmission mechanism and the other end connected to rear movable links of the rear link mechanisms.

2. The seat support mechanism of claim 1, wherein the seat support mechanism is of an independent suspension type where the front link mechanisms and the rear link mechanisms function independently of each other.

3. The seat support mechanism of claim 1, further comprising connection movable links connecting the front link mechanisms and the rear link mechanisms, wherein
the front link mechanisms and the rear link mechanisms operate synchronously.

4. The seat support mechanism of claim 1, wherein
the rotor of the rotational force transmission mechanism includes:
a front rotor configured to be rotated by a rotational force of the clutch mechanism; and
a rear rotor configured to be rotated by the front rotor through a connection drive link,
one end of the front torsion bar is connected to a rotation center of the front rotor, and
one end of the rear torsion bar is connected to a rotation center of the rear rotor.

5. The seat support mechanism of claim 4, wherein
one of the front rotor and the rear rotor is a sector gear that is rotated by an output gear of the clutch mechanism, and
the one end of the front torsion bar or the rear torsion bar is connected to a rotation center of the sector gear.

6. The seat support mechanism of claim 1, wherein the base is an upper rail of a slider for adjusting a front-rear position.

7. A seat structure comprising a seat cushion supported by the seat support mechanism of claim 1, wherein
the seat cushion includes:
a base net extending between two frame members disposed at a predetermined distance in a front-rear direction of the cushion frame; and
a cushion member disposed so as to cover the base net,
a front edge and a rear edge of the base net extend over the two frame members,
the front edge and the rear edge are disposed so as to be connected by a spring member, and
the spring member is arranged in series with the torsion bar included in the seat support mechanism.

8. The seat structure of claim 7, wherein
the base net consists of a two-dimensional or three-dimensional knitted fabric, and
the spring member consists of a coil spring.

9. The seat structure of claim 7, wherein the cushion member disposed so as to cover the base net consists of a urethane material, a three-dimensional knitted fabric, or a combination thereof.

10. A suspension seat wherein a base of a seat structure including a seat cushion supported by the seat support mechanism of claim 1 is supported by an upper portion of a suspension mechanism having a function of absorbing vibration in three directions consisting of horizontal, front-rear, and vertical directions.

11. The suspension seat of claim 10, wherein
the seat cushion includes:
a base net extending between two frame members disposed at a predetermined distance in a front-rear direction of the cushion frame; and
a cushion member disposed so as to cover the base net,
a front edge and a rear edge of the base net extend over the frame members,
the front edge and the rear edge are connected by a spring member, and
the spring member is arranged in series with the torsion bar included in the seat support mechanism.

* * * * *